(12) United States Patent
Crouch et al.

(10) Patent No.: US 12,183,211 B2
(45) Date of Patent: Dec. 31, 2024

(54) METHOD AND SYSTEM FOR INITIATING AND MANAGING REQUIRED TIME OF ARRIVAL CONSTRAINTS FOR AN AIRCRAFT FOR ALL PHASES OF FLIGHT

(71) Applicant: HONEYWELL INTERNATIONAL INC., Charlotte, NC (US)

(72) Inventors: Steven Curtis Crouch, Mesa, AZ (US); Santosh Mathan, Seattle, WA (US); Matthew Joseph, Scottsdale, AZ (US); Bradley Bootz, Phoenix, AZ (US); Richard Snyder, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 324 days.

(21) Appl. No.: 17/398,733

(22) Filed: Aug. 10, 2021

(65) Prior Publication Data

US 2022/0051573 A1 Feb. 17, 2022

Related U.S. Application Data

(60) Provisional application No. 63/065,934, filed on Aug. 14, 2020.

(51) Int. Cl.
*G08G 5/00* (2006.01)

(52) U.S. Cl.
CPC ......... *G08G 5/0021* (2013.01); *G08G 5/0013* (2013.01)

(58) Field of Classification Search
CPC ............... G08G 5/0013; G08G 5/0021; G08G 5/0004; G08G 5/0017
See application file for complete search history.

(56) References Cited

U.S. PATENT DOCUMENTS

| | | | |
|---|---|---|---|
| 9,266,621 B2 | 2/2016 | Polansky et al. | |
| 10,584,979 B1* | 3/2020 | Gunn | G08G 5/0047 |
| 2010/0114406 A1* | 5/2010 | DeJonge | G08G 5/0021 |
| | | | 701/1 |
| 2010/0114407 A1 | 5/2010 | Klooster et al. | |
| 2010/0131124 A1 | 5/2010 | Klooster | |
| 2013/0060466 A1* | 3/2013 | Gurusamy | G01C 23/005 |
| | | | 701/465 |
| 2014/0278069 A1* | 9/2014 | Passinger | G08G 5/0052 |
| | | | 701/465 |
| 2015/0045989 A1* | 2/2015 | Polansky | G01C 23/00 |
| | | | 701/2 |
| 2016/0069688 A1 | 3/2016 | Polansky et al. | |

(Continued)

FOREIGN PATENT DOCUMENTS

| | | |
|---|---|---|
| EP | 2837914 A1 | 2/2015 |
| EP | 3109723 A1 | 12/2016 |

*Primary Examiner* — Justin S Lee

(74) *Attorney, Agent, or Firm* — Lorenz & Kopf LLP

(57) ABSTRACT

Methods and apparatus are provided for performing determinations and actions as to a required time of arrival (RTA) for an aircraft during flight. In exemplary embodiments, data is received as to the RTA for the aircraft during flight. Also in exemplary embodiments, determinations are made, via a processor, as to one or more RTA limits for the aircraft based on the RTA. Also in exemplary embodiments, the RTA limits comprise one or both of the following: one or more limits for aircraft speed based on the RTA; and one or more limits for aircraft arrival time based on the RTA.

20 Claims, 29 Drawing Sheets

(56) References Cited

U.S. PATENT DOCUMENTS

| | | | |
|---|---|---|---|
| 2016/0379501 A1* | 12/2016 | Garrido Lopez | G08G 5/0052 |
| | | | 701/5 |
| 2019/0164440 A1* | 5/2019 | Briand | G06F 3/04847 |
| 2020/0090523 A1 | 3/2020 | Arnoux et al. | |
| 2020/0168106 A1* | 5/2020 | De Prins | G08G 5/003 |
| 2022/0051575 A1* | 2/2022 | Matsuno | G08G 5/0052 |

* cited by examiner

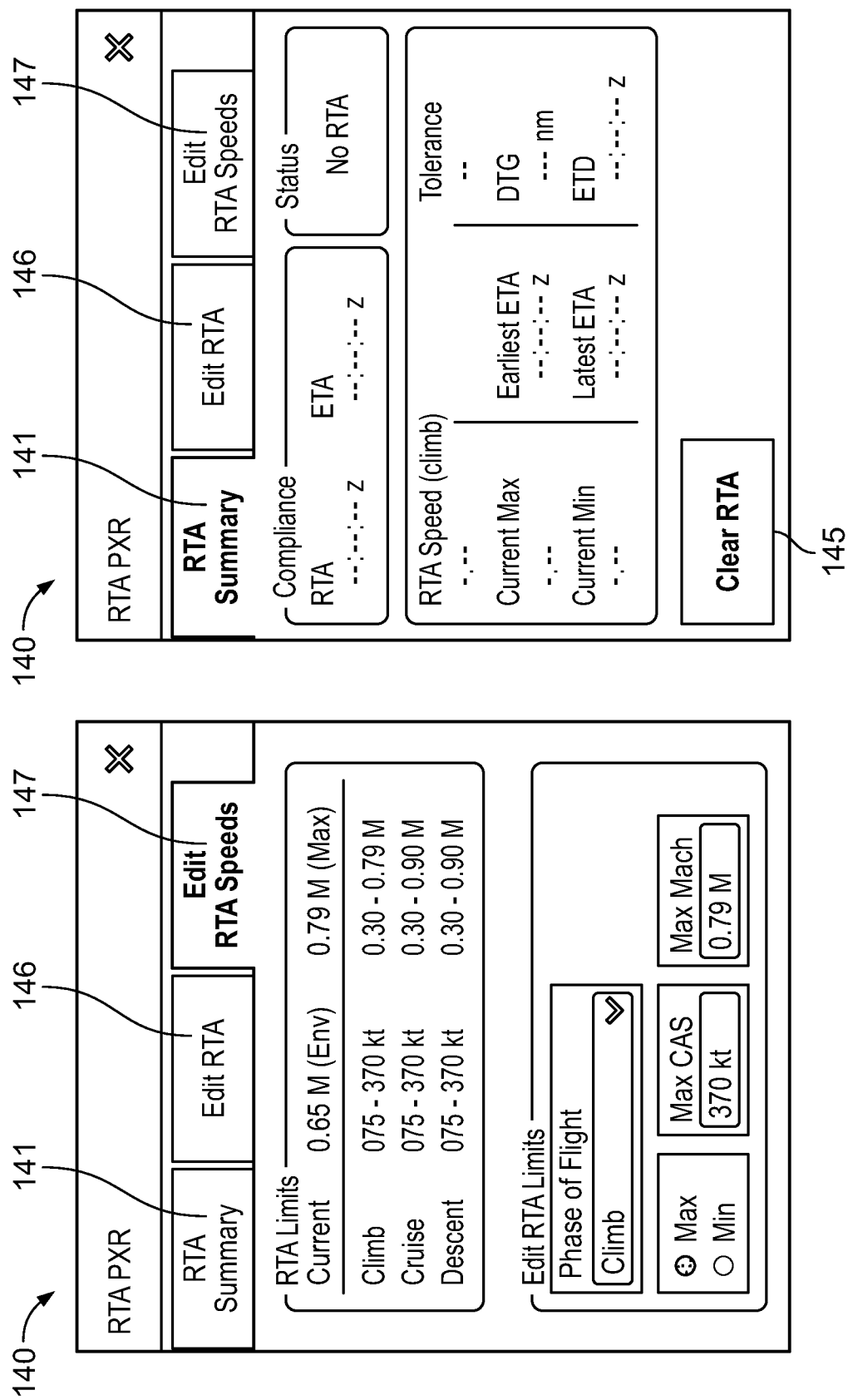

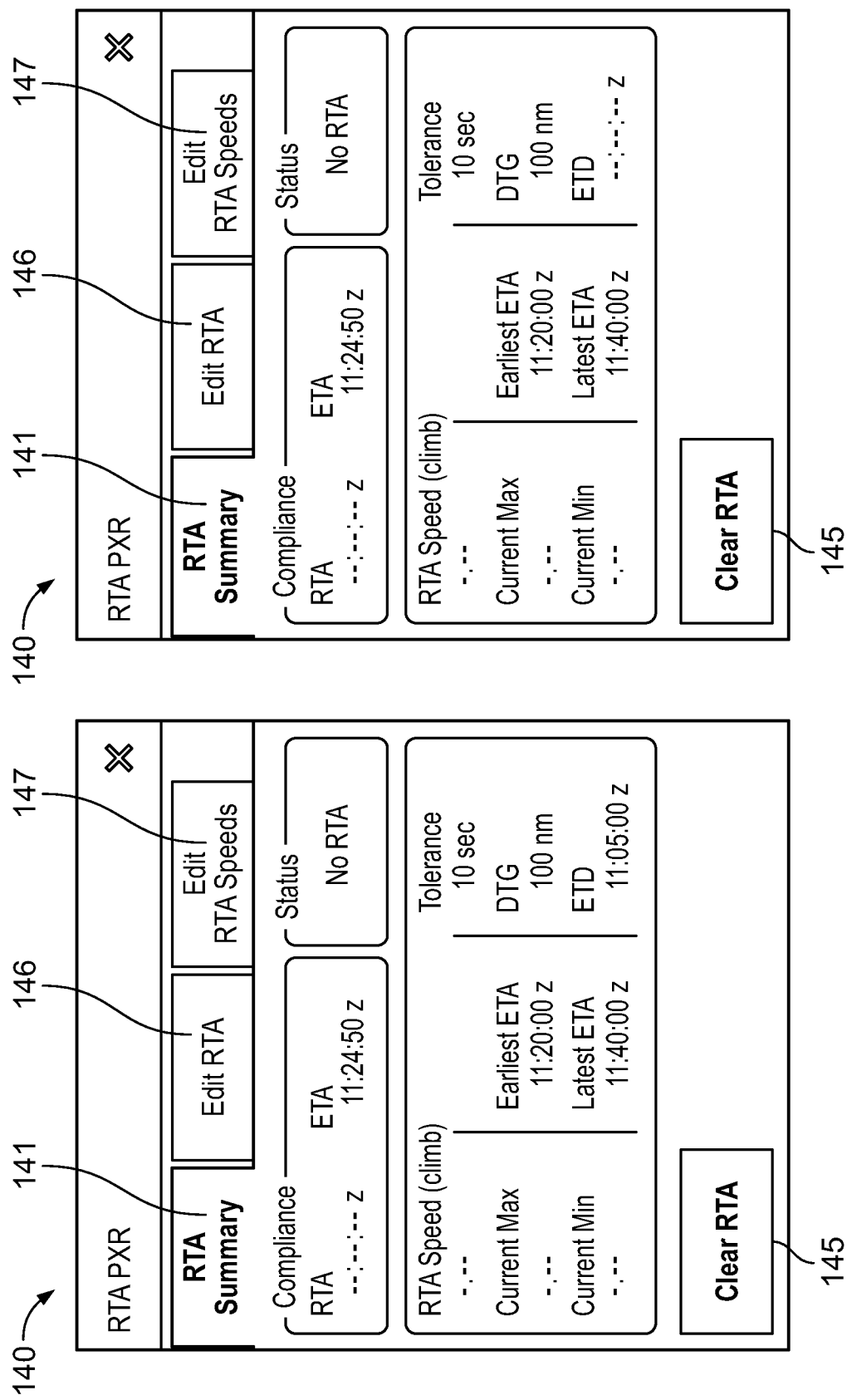

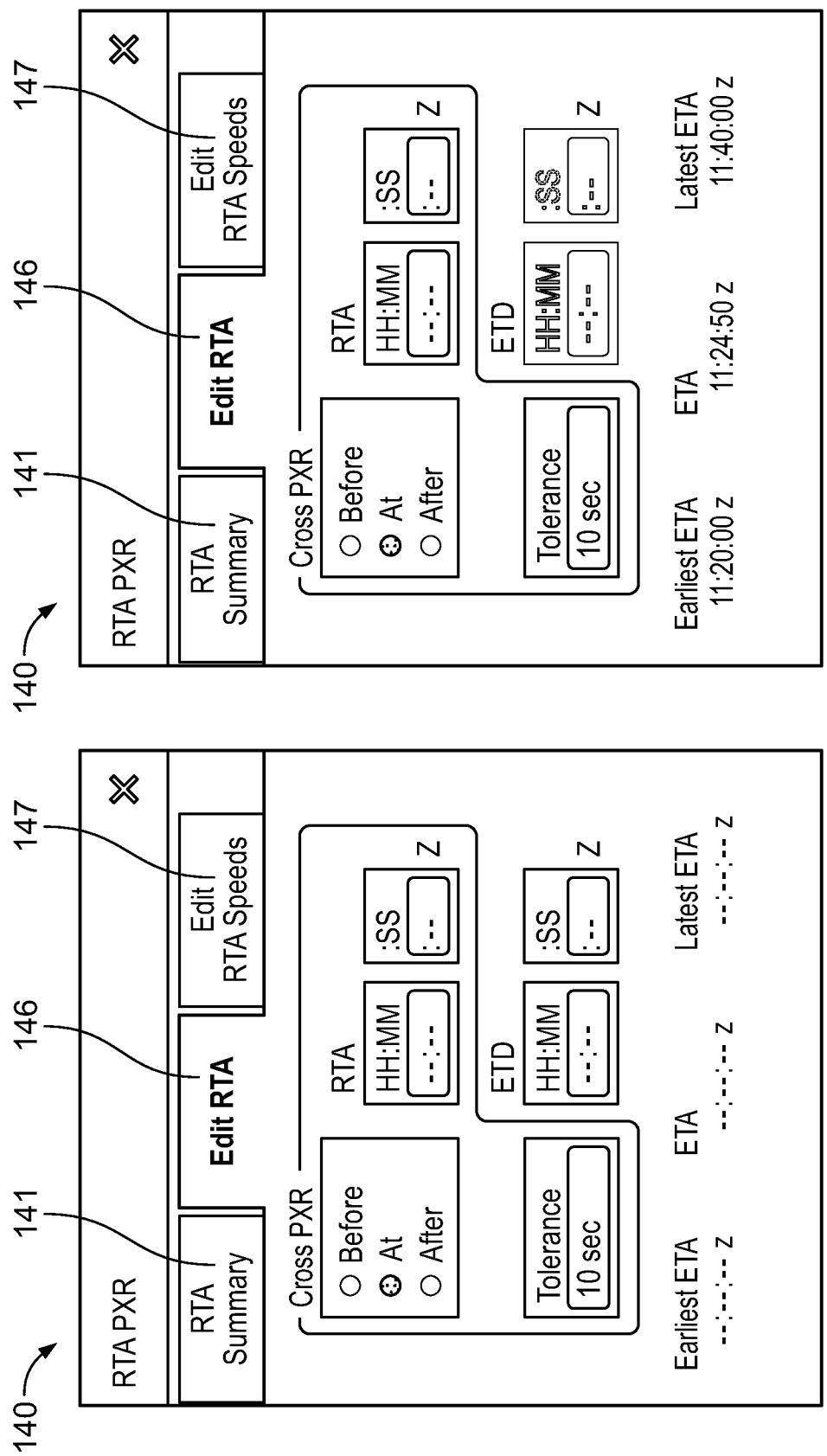

FIG. 17 (1700)

| Init | FMS Setup | Auto Speeds | Tools | DFCS | Custom DB | DTLK Manager | System Config |

V-Speeds | Summary

Take-Off SF1/SF2
 V2 to V2+10 kt

Go-Around SF1/SF2/SF3
 VRF* to VRF*+20 kt

At TOsa/GAsa
 VFT kt

Constraints
Speed
Hold Speed

RTA at   Speed
Limits

Departure Speed
 200 kt

Departure AGL
 2500 ft

Radial Distance
 4.0 nm

Climb Speed
 Manual
 280 kt / 0.80 M

Cruise Speed
 Long Range Cruise
 280 kt / 0.80 M

Descent Speed
 Default
 275 kt / 0.81 M / 3.0°

Approach AGL
 10000 ft
Radial to Dest
 15.0 nm
Clean
 190 kt
SF1
 180 kt
SF2
 180 kt
SF3
 VAP

| Init | FMS Setup | Auto Speeds | Tools | DFCS | Custom DB | DTLK Manager | System Config |

Limits | Required Time of Arrival (RTA)

Landing Speeds
Clean
 190 kt
SF1
 180 kt
SF2
 170 kt
SF3
 VAP

Speed Limit
 Descent ▼

Speed       Below Altitude
 183 kt      13500 ft

RTA Limits
Current  -.-- M (Env)  -.-- M (Max)

Climb    075 - 370 kt   0.30 - 0.90 M
Cruise   075 - 370 kt   0.30 - 0.90 M
Descent  075 - 370 kt   0.30 - 0.90 M Edit RTA Limits
Phase of Flight
 Climb ▼

⊙ Max     Max CAS     Max Mach
○ Min      370 kt      0.90 M

○○○○

1700

| Init | FMS Setup | Auto Speeds | Tools | DFCS | Custom DB | DTLK Manager | System Config |

| V-Speeds | Summary | | | De |

Take-Off SF1/SF2
  V2 to V2+10 kt
Go-Around SF1/SF2/SF3
  VRF* to VRF*+20 kt
At TOsa/GAsa
  VFT kt Constraints
Speed
Hold Speed RTA at PXR    Speed 0.79 M
Limits (Climb)
  0.65 M (Env) - 0.79 M (Max)

Departure Speed
  200 kt
Departure AGL
  2500 ft
Radial Distance
  4.0 nm

Climb Speed
  RTA
  285 kt / 0.79 M
Cruise Speed
  Long Range Cruise
  310 kt / 0.84 M
Descent Speed
  Default
  275 kt / 0.81 M / 3.0°

Approach AGL
  10000 ft
Radial to Dest
  15.0 nm
Clean
  190 kt
SF1
  180 kt
SF2
  180 kt
SF3
  VAP

| Init | FMS Setup | Auto Speeds | Tools | DFCS | Custom DB | DTLK Manager | System Config |

| Departure | Climb | Cruise | Descent |

Dep Speed: 200 Kt
AGL: 2500 Ft
Radial Dist: 4.0 NM

Speed: RTA
Knots: 280 kt    Mach: 0.80 M

Cruise Speed: Long Range Cruise
Knots: 280 kt    Mach: 0.80 M

Speed: Default
Knots: 275 kt

| Init | FMS Setup | Auto Speeds | Tools | DFCS | Custom DB | DTLK Manager | System Config |

Departure

Dep Speed: 200 Kt
AGL: 2500 Ft
Radial Dist: 4.0 NM

Climb

Speed: Manual
Knots: 280 kt
Mach: 0.80 M

Cruise

Cruise Speed: RTA
Knots: 280 kt
Mach: 0.80 M

Descent

Speed: Default
Knots: 275 kt

| Init | FMS Setup | Auto Speeds | Tools | DFCS | Custom DB | DTLK Manager | System Config |

Descent

Descent Speed: RTA
Desc Knots: 275 kt
Desc Mach: 0.81 M
Idle
Path Angle: 3.0°

Approach Speeds

AGL: 10000 Ft
Radial to Dest: 15.0 NM
1st App Wpt

Landing Speeds

Clean: 190 kt
SF1: 180 kt
SF2: 170 kt
SF3: VAP

Limits

Spee[d]
Des[c]

Spee[d]
183

| Init | FMS Setup | Auto Speeds | Tools | DFCS | Custom DB | DTLK Manager | System Config |

Landing Speeds
- Clean: 190 kt
- SF1: 180 kt
- SF2: 170 kt
- SF3: VAP

Limits
- Speed Limit: Descent
- Speed: 183 kt
- Below Altitude: 13500 ft

Required Time of Arrival (RTA)

RTA Limits
- Current: 0.65 M (Env)   0.79 M (Max)
- Climb: 075 - 370 kt   0.30 - 0.79 M
- Cruise: 075 - 370 kt   0.30 - 0.90 M
- Descent: 075 - 370 kt   0.30 - 0.90 M Edit RTA Limits
- Phase of Flight: Climb
- ⊙ Max  ○ Min
- Max CAS: 370 kt
- Max Mach: 0.79 M

| Init | FMS Setup | Auto Speeds | Tools | DFCS | Custom DB | DTLK Manager | System Config |

V-Speeds
- Take-Off SF1/SF2
  - V2 to V2+10 kt
- Go-Around SF1/SF2/SF3
  - VRF* to VRF*+20 kt
- At TOsa/GAsa
  - VFT kt Constraints
- Speed
- Hold Speed RTA at PXR    Speed 0.84 M
Limits (Climb)
  0.65 M (Env) - 0.90 M (Max)

Summary

Departure Speed
  200 kt
Departure AGL
  2500 ft
Radial Distance
  4.0 nm

Climb Speed
  Manual
  285 kt / 0.79 M

Cruise Speed
  RTA
  310 kt / 0.84 M

Descent Speed
  Manual
  275 kt / 0.81 M / 3.0°

Approach AGL
  10000 ft
Radial to Dest
  15.0 nm

Clean
  190 kt
SF1
  180 kt
SF2
  180 kt
SF3
  VAP

| Init | FMS Setup | Auto Speeds | Tools | DFCS | Custom DB | DTLK Manager | System Config |

| Limits | Required Time of Arrival (RTA) |

Landing Speeds
- Clean: 190 kt
- SF1: 180 kt
- SF2: 170 kt
- SF3: VAP

Speed Limit: Descent
Speed: 183 kt    Below Altitude: 13500 ft

RTA Limits
Current    -.-- M (Env)    -.-- M (Max)
Climb      075 - 370 kt    0.30 - 0.90 M
Cruise     075 - 370 kt    0.30 - 0.90 M
Descent    075 - 370 kt    0.30 - 0.90 M

Edit RTA Limits
Phase of Flight: Climb
⊙ Max   Max CAS: 370 kt   Max Mach: 0.90 M
○ Min

| Init | FMS Setup | Auto Speeds | Tools | DFCS | Custom DB | DTLK Manager | System Config |

V-Speeds

Take-Off SF1/SF2
  V2 to V2+10 kt

Go-Around SF1/SF2/SF3
  VRF* to VRF*+20 kt

At TOsa/GAsa
  VFT kt

Constraints
Speed
Hold Speed

RTA at PXR    Speed 0.79 M
Limits (Climb)
  0.65 M (Env) - 0.79 M (Max)

Summary

Departure Speed
  200 kt
Departure AGL
  2500 ft
Radial Distance
  4.0 nm

Climb Speed
  Manual
  280 kt / 0.80 M
Cruise Speed
  Long Range Cruise
  280 kt / 0.80 M
Descent Speed
  RTA
  275 kt / 0.79 M / 3.0°

Approach AGL
  10000 ft
Radial to Dest
  15.0 nm
Clean
  190 kt
SF1
  180 kt
SF2
  180 kt
SF3
  VAP

Aircraft is now Targeting and Flying to the Waypoint with RTA Constraints and Speed; showing the Flight Crew they are "on time" to meet the Constraint

In the "Auto Speeds" Tab of the Avionics Window Application, the Cruise Speed for the Cruise Phase of Flight has been Automatically Updated to the Reflect the RTA Constraint and Required Speeds to Meet the Constraint.

| Init | FMS Setup | Auto Speeds | Tools | DFCS | Custom DB | DTLK Manager | System Config |
|---|---|---|---|---|---|---|---|

V-Speeds | Summary | De

Take-Off SF1/SF2
 V2 to V2+10 kt

Go-Around SF1/SF2/SF3
 VRF* to VRF*+20 kt

At TOsa/GAsa
 VFT kt

Departure Speed
 200 kt

Departure AGL
 2500 ft

Radial Distance
 4.0 nm

Climb Speed
 Manual
 285 kt / 0.79 M

Cruise Speed
 RTA
 370 kt / 0.90 M

Descent Speed
 Manual
 275 kt / 0.81 M / 3.0°

Approach AGL
 10000 ft
Radial to Dest
 15.0 nm
Clean
 190 kt
SF1
 180 kt
SF2
 180 kt
SF3
 VAP Constraints
Speed
Hold Speed RTA at PXR  Speed 0.90 M
Limits (Climb)
 0.65 M (Env) - 0.90 M (Max)

Pilot can Swipe to the "Cruise" Section of the Auto Speeds tab to see that the RTA Constraint is Active

| Init | FMS Setup | Auto Speeds | Tools | DFCS | Custom DB | DTLK Manager | System Config |
|---|---|---|---|---|---|---|---|

| Departure | Climb | Cruise | Descent |
|---|---|---|---|
| Dep Speed<br>200 Kt | Speed<br>Manual ▽ | Cruise Speed<br>RTA ▽ | Speed<br>Manual |
| AGL<br>2500 Ft | Knots  Mach<br>285 kt  0.79 M | Knots  Mach<br>370 kt  0.90 M | Knots<br>275 kt |
| Radial Dist<br>4.0 NM | | | |

FIG. 35B

METHOD AND SYSTEM FOR INITIATING AND MANAGING REQUIRED TIME OF ARRIVAL CONSTRAINTS FOR AN AIRCRAFT FOR ALL PHASES OF FLIGHT

CROSS-REFERENCES TO RELATED APPLICATIONS

This application claims the benefit of U.S. Application No. 63/065,934, filed Aug. 14, 2020, the entirety of which is incorporated by reference as if fully set forth herein.

TECHNICAL FIELD

The technical field generally relates to the field of aircraft and, more specifically, to aircraft facing required time of arrival constraints during flight.

BACKGROUND

Many aircraft today face required time of arrival (RTA) constraints during flight. However, existing techniques may not always be optimal under certain circumstances. For example, certain existing techniques may be relatively cumbersome for the flight crew to understand and use. In addition, as RTA regulatory requirements become adopted and implemented in a more widespread manner by aviation authorities, it may be desirable to further facilitate compliance with regulations requiring RTA capability on aircraft, and to further facilitate pilots' quick and easy compliance with RTA-related air traffic control (ATC) instructions.

Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a method is provided that includes: (i) receiving data as to a required time of arrival (RTA) for an aircraft during flight; and (ii) determining, via a processor, one or more RTA limits for the aircraft based on the RTA, wherein the one or more RTA limits comprise one or both of the following: (a) one or more limits for aircraft speed based on the RTA; and (b) one or more limits for aircraft arrival time based on the RTA In accordance with another exemplary embodiment, a program product is provided that includes a non-transitory computer readable storage medium and a processor. The non-transitory computer readable storage media is configured to store a program that is configured to at least facilitate: (i) receiving data as to a required time of arrival (RTA) for an aircraft during flight; and (ii) determining, via a processor, one or more RTA limits for the aircraft based on the RTA, wherein the one or more RTA limits comprise one or both of the following: (a) one or more limits for aircraft speed based on the RTA; and (b) one or more limits for aircraft arrival time based on the RTA.

In accordance with a further exemplary embodiments, an aircraft is provided that includes a body, a propulsion system configured to move the body, and a control system configured to control the propulsion system. The control system includes a non-transitory computer readable storage medium and a processor. The non-transitory computer readable storage media is configured to store a program that is configured to at least facilitate: (i) receiving data as to a required time of arrival (RTA) for an aircraft during flight; and (ii) determining, via a processor, one or more RTA limits for the aircraft based on the RTA, wherein the one or more RTA limits comprise one or both of the following: (a) one or more limits for aircraft speed based on the RTA; and (b) one or more limits for aircraft arrival time based on the RTA Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 1B-1D, 2-34, 35A, 35B, and 36-37 depict various display screens, including sub-displays of or associated with the display of FIG. 1A, that further illustrate exemplary implementations of the workflow for systems and methods for required time of arrival (RTA) functionality for aircraft during flight functionality for an aircraft during flight, and that can be implemented in connection with a vehicle (e.g., aircraft), including the control system thereof, in accordance with an exemplary embodiment.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

As provided herein and in the Figures to this application, incorporated herein by reference, methods, systems, and software are provided that help to initiate and manage required time of arrival constraints for an aircraft for all phases of flight, in accordance with exemplary embodiments.

Figure 1A:
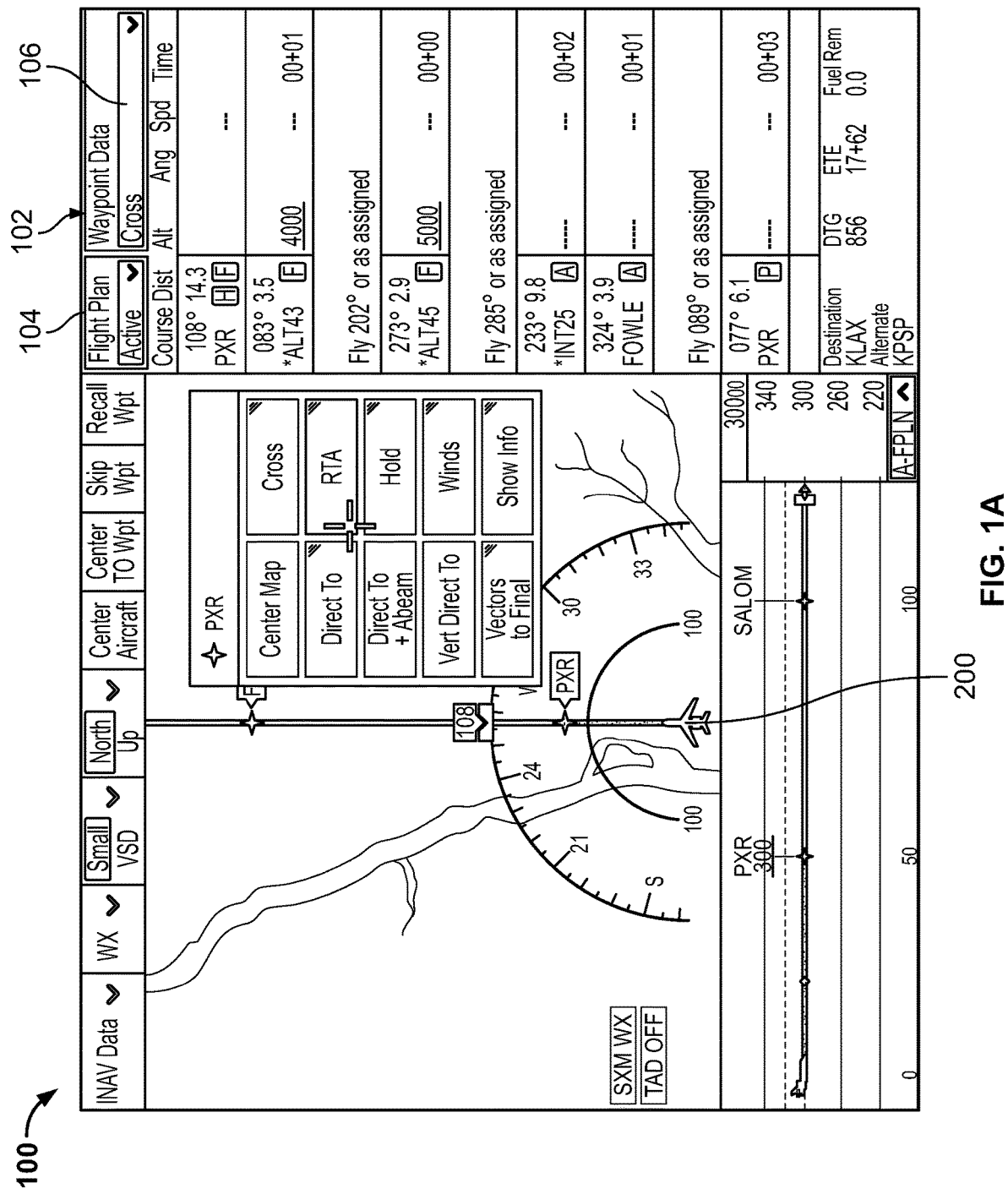
FIG. 1A illustrates an aircraft display illustrating workflow functionality for systems and methods for required time of arrival (RTA) functionality for aircraft during flight, in accordance with an exemplary embodiment.

With reference first to FIG. 1A, an aircraft display 100 is provided in accordance with an exemplary embodiment. The display 100 of FIG. illustrates workflow functionality for systems and methods for required time of arrival (RTA) functionality for aircraft during flight, in accordance with an exemplary embodiment. The display 100 (along with the systems, methods, and functionality related thereto) are discussed in greater detail below in connection with FIGS. 1B-1D as well as FIGS. 2-38.

As discussed in greater detail below, FIGS. 1B-1D and FIGS. 2-37 depict various display screens, including sub-displays of or associated with the display 100 of FIG. 1A, that further illustrate exemplary implementations of the workflow for systems and methods for required time of arrival (RTA) functionality for aircraft during flight functionality for an aircraft during flight. Also as described in greater detail further below, the display 100, along with the systems, methods, and functionality related thereto, and along with the implementations of FIGS. 1B-1D and FIGS. 2-37, can be implemented in connection with a vehicle (e.g., aircraft) 1100 as depicted in FIG. 38, including the control system 1110 thereof, in accordance with an exemplary embodiment. In certain embodiments, the display 100 (and associated systems, methods, workflow, and functionality) is associated with an aircraft (e.g., as depicted in FIG. 38 and described further below in connection therewith). In certain other embodiments, the display 100 (and associated systems, methods, workflow, and functionality) may also be associated with one or more other vehicles, such as an automobile, locomotive, marine vehicle, spacecraft, and so on, and/or one or more other types of mobile platforms, and associated control systems, computer systems, computer program products, and the like.

In various embodiments, and as depicted in the Figures hereto, methods, systems, and computer program products and software are provided for a user interface for required time of arrival (RTA) functionality. As described in greater detail further below and in the Figures, the disclosed methods, systems, and computer program products and software provide a user interface that succinctly provides indications to the crew for various RTA information and instructions, that is intuitive and easy to understand by the crew, that does not place an undue burden on the crew, that provides both a manner to easily change the desired aircraft speed through all phases of flight to meet RTA and air traffic control (ATC) requirements through all phases of flight, and that provide easy access for the flight crew to set an RTA constraint for any phase of flight, adjust the aircraft speeds to meet the RTA constraint, and to easily observe or see the status of the RTA constraint, along with other potential advantages.

In various embodiments, the disclosed methods, systems, and computer program products and software provide for a full-phase required time of arrival (RTA) user interface for use in all phases of operation of the aircraft: including climb, cruise, and descent of the aircraft.

Also in various embodiments, the user interface (and the disclosed methods, systems, and computer program products and software provide for crew data definition and display, including for RTA waypoints, RTA time, RTA type (e.g., AT, AT or Before, and AT or AFTER). In addition, in various embodiments, the user interface provides for crew interaction for RTA entry, including for manual and/or datalink RTA data entry.

In addition, in various embodiments, the user interface and the disclosed methods, systems, and computer program products and software provide for RTA features that include, among others: speed adjustment (e.g., TOA) and tailoring of RTA response (e.g., RTA tolerance, minimum/maximum RTA speeds, ETD, and so on).

Also in various embodiments, the user interface and the disclosed methods, systems, and computer program products and software provide for other RTA data being displayed for the crew of the aircraft, including various data such as ETD/RTT, Time Error, Arrival Status, ETA Window (e.g., Earliest ETA, Latest ETA), RTA, ETA, RTA Speed, DTG, Crossing Data at the RTA waypoint, RTA operational limits, and so on.

Also in various embodiments, the user interface and the disclosed methods, systems, and computer program products and software provide for RTA enhancements, including wind and/or temperature waypoints, wind and/or temperature climb forecasts, wind and/or temperature descent forecasts, and/or AFIS Report, among others. For example, in certain embodiments, at least ten (10) specifications are allowed per waypoint (which can, for example, increase the fidelity of the RTA solution).

Also in various embodiments, the user interface and the disclosed methods, systems, and computer program products and software provide for deletion and deactivation under appropriate circumstances. For example, in certain embodiments, the RTA may be activated or deactivated in the flight plan and/or for speed control.

In various embodiments, the full phase RTA function includes the following capabilities: (i) being able to meet RTA requirements with accuracy within a predetermined time accuracy tolerance in climb, cruise, and descent (e.g., within ten seconds accuracy as a default tolerance in climb, cruise, and descent in an exemplary embodiment, but with the tolerance being adjustable by the user in certain embodiments) with a ninety five percent (95%) probability; (ii) being able to identify RTAs that are unfeasible; (iii) being able to enter RTAs with precision in seconds; and (iv) being able to computer earliest and latest ETAs for all waypoints in the flight plan or route.

In various embodiments, as disclosed in the Figures and described herein, the disclosed methods, systems, and computer program products provide for a user interface that provides the aircraft crew members with an interactive display in connection with the RTA work-flow. The user interface will be described below in connection with a number of different exemplary scenarios that may be encountered by aircraft in connection with various phases of aircraft operation (including climb, cruise, and descent), in accordance with various exemplary embodiments depicted in the Figures and described below.

With reference specifically first to FIG. 1A, in various embodiments, the display 100 depicts an indicator of the aircraft 1100 and its surroundings, as well as data pertaining to the flight of the aircraft 1100, such as altitude, speed, heading travel direction, travel route, waypoints, environment surrounding the vehicle, and so on.

As depicted in FIG. 1A, the display 100 provides an RTA interface 102, including a box with menu options for selection by the pilots. As depicted in FIG. 1A, in various embodiments, the RTA interface 102 includes multiple selection icons, including an "Active" tab 104 and a Drop Down Menu tab 106. In certain embodiments, when the tab 106 is selected, a dialog box is opened. In various embodiments, as shown in the Figures, upon the selection of this option, a dialog box is opened. Also in various embodiments, when an "RTA" tab is chosen and no RTA exists, then an "Edit RTA" dialog box is auto opened, which allows for simple and easy RTA definition. In addition, as depicted in FIG. 1, display screen 110 also includes information as to various other information, such as vertical direction, height, speed, climb versus descent, angle, flyover, and additional information as depicted in FIG. 1A in accordance with an exemplary embodiment.

Figures 1B, 1C:
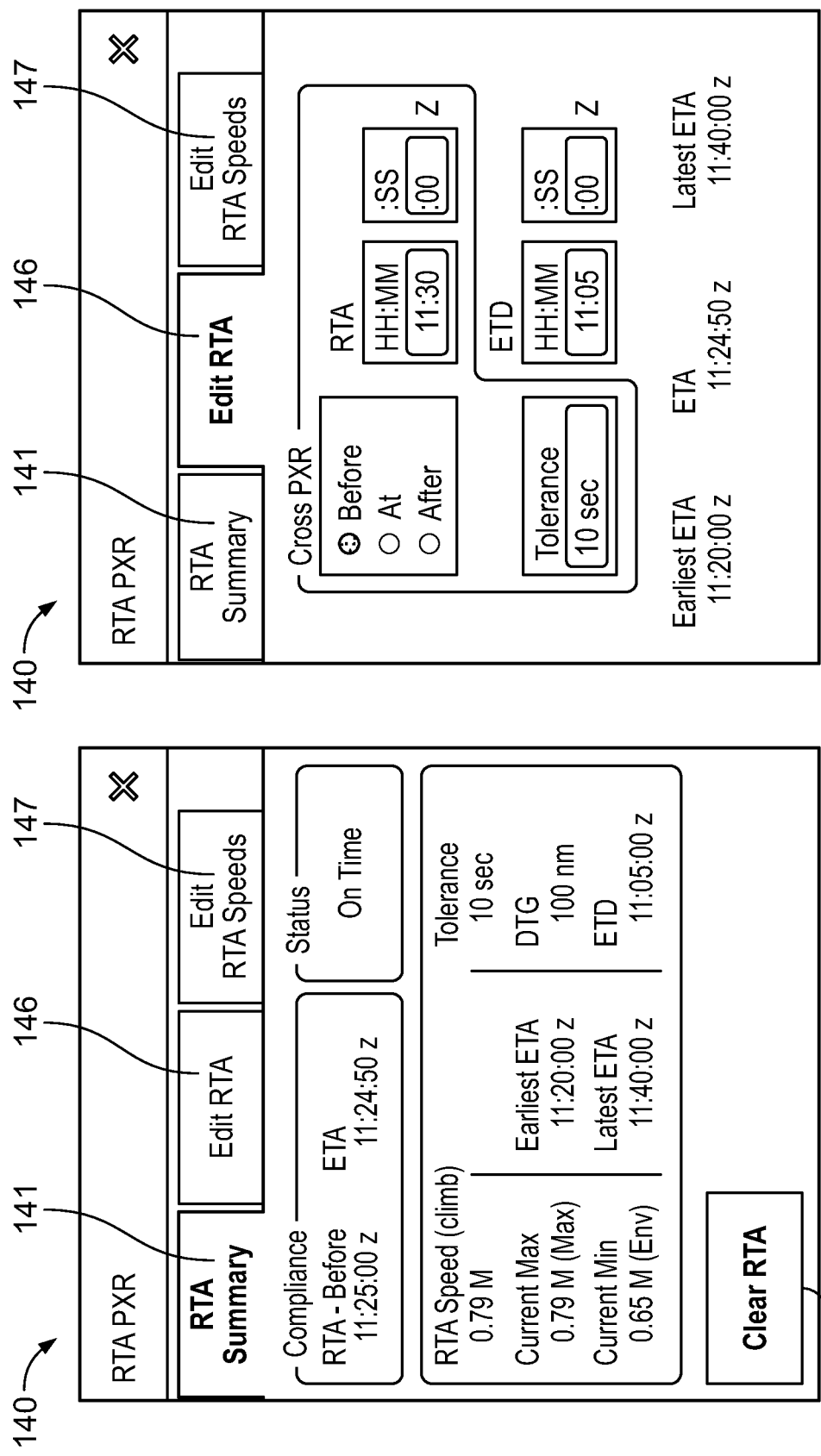

Also as depicted in FIG. 1A as well as in FIGS. 1B, 1C, and 1D), an additional display screen 140 (a new "RTA PXR" screen) is also provided in an exemplary embodiment.

In various embodiments, display screen 140 includes information as to the RTA, the Tolerance for the RTA, the "RTA speed" (e.g., an aircraft speed required to meet the RTA), maximum and minimum speeds for meeting the RTA within the Tolerance thereof, the ETA, the Earliest ETA and Latest DT (e.g., for the destination and each waypoint en route to the destination) to meet the RTA within its Tolerance, and related data and information. Also as depicted in FIGS. 1B-1D, display screen 140 includes similar top input selection icons to display screen 110 (namely, "General" 112 and "RTA" 144") as well as different bottom input selection icons; namely: (i) "RTA Summary" 141; (ii) "Clear RTA" 145; (iii) "Edit RTA" 146; and (iv) "Edit RTA speeds" 147.

With reference to FIG. 2, display screen 140 of FIGS. 1B-1D is depicted in accordance with a first scenario in which the aircraft is on the ground with no ETD or RTA, in accordance with various embodiments. Specifically, in various embodiments, under this scenario: (i) the RTA Summary tab 141 is open with no RTA defined on waypoint (e.g., waypoint PXR); (ii) the Status displays "No RTA" due to the FMS lacking RTA defining data (once entered, the Status can become "On Time", "Early", or "Late"); (iii) the distance until the aircraft reaches the selected waypoint is shown under the DTG field (e.g., his can be calculated without defining any other data on the RTA interface); (iv) the defined tolerance to the RTA time that indicates an acceptable control limit (e.g., the RTA constraint is properly satisfied and no alerting indications are provided to the pilot). In accordance with an exemplary embodiment, the user interface of the display 100 includes the following features under this scenario: (i) the Status is presented in a grey "No RTA" in certain embodiments (because the RTA is not defined); (ii) the FMS is calculated and default values are displayed in green in certain embodiments (e.g., because Tolerance is defaulted and DTG is FMS calculated); (iii) to enter the defining data the pilot selects the Edit RTA 146 and/or the Edit RTA Speeds 147 buttons/tabs at the bottom of the dialog box; (iv) Time related data is located in the Edit RTA dialog box while speed defining data can be edited in the Edit RTA Speeds dialog box; and (v) the "Clear RTA" prompt/tab 145 at the bottom of the page can be used to clear a defined RTA and delete it from the flight plan if the pilot wishes to do so.

With reference to FIG. 3, display screen 140 is depicted in accordance with a second scenario in which the aircraft is on the ground with an ETD entered but no RTA being defined, in accordance with various embodiments. Specifically, in various embodiments, under this scenario: (i) the RTA Summary tab is open with no RTA defined; (ii) the estimated time of departure (ETD) is entered allowing the FMS to calculate and display the earliest and latest estimated time of arrival (ETA) as well as the predicted ETA; (iii) the Earliest ETA and Latest ETA give the pilot intuition into what a reasonable RTA value could be for the waypoint. In addition, in various embodiments, under this scenario, the user interface aspects provide for the ETA window as well as the ETA and FMS values, all of which are computed values, to be displayed in green (in certain embodiments) on the user interface. In addition, also in various embodiments, the ETA's are located in the center column, as shown in FIG. 3.

With reference to FIG. 4, display screen 140 is depicted in accordance with a third scenario in which the RTA Summary tab 141 is engaged, the aircraft is in the air, with no ETD or RTA, in accordance with various embodiments. Specifically, under this scenario: (i) the RTA Summary tab 141 is open with no RTA defined; (ii) once the aircraft is in the air, the ETD becomes irrelevant for FMS calculations and is dashed out; and (iii) with the current time known, the FMS can calculate the Earliest ETA, ETA, and Latest ETA using speed estimates and other performance data. As depicted in FIG. 4, in various embodiments the ETA, Earliest ETA, and Latest ETA and now provided on the display screen 140.

Figures 5, 6:
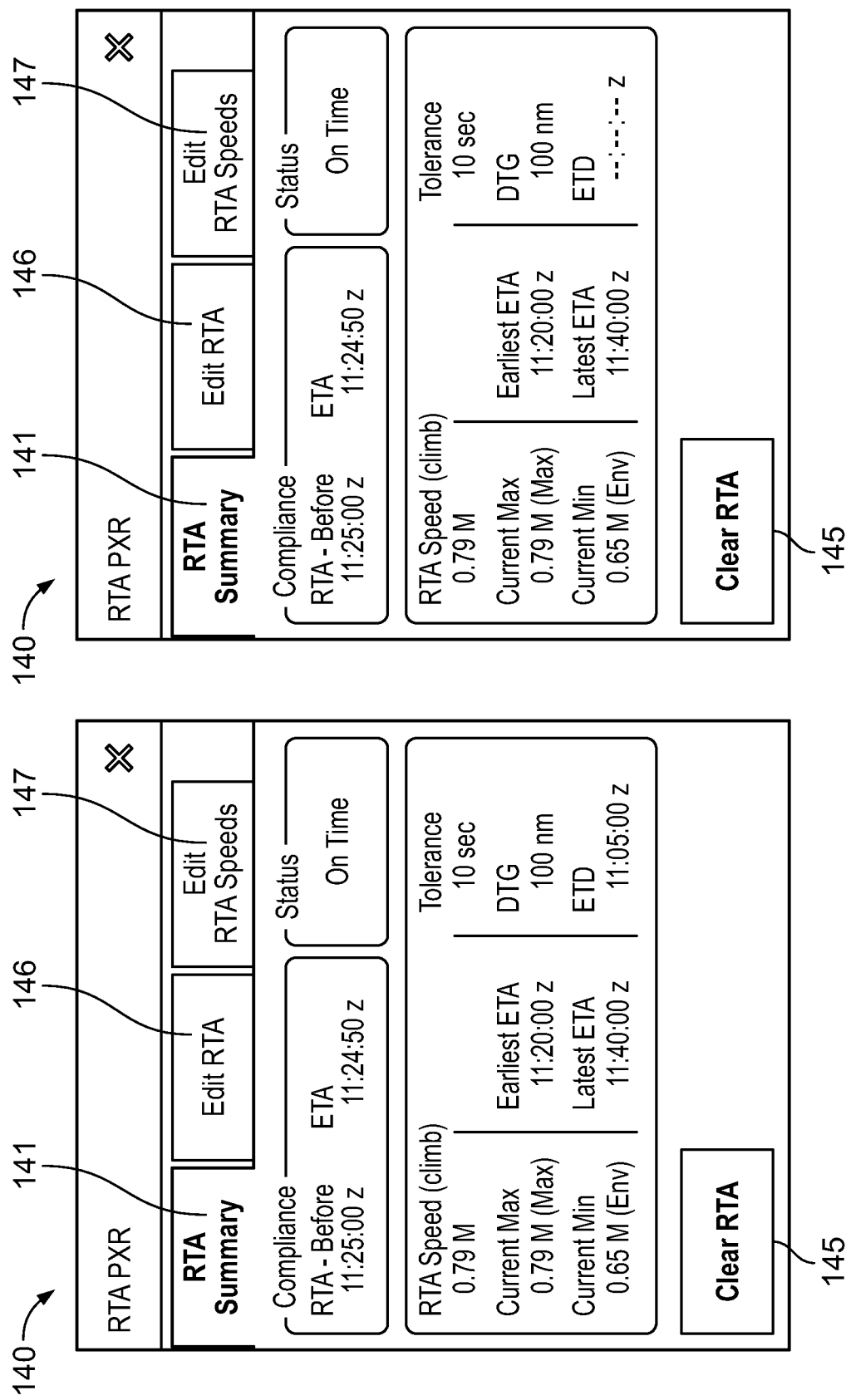

With reference to FIG. 5, display screen 140 is depicted in accordance with a fourth scenario in which the RTA Summary tab 141 is engaged and on-time before RTA is defined, in accordance with various embodiments. In certain embodiments, the RTA constraint is provided, created, and/or set during flight (while in certain embodiments the RTA constraint may be provided, created, and/or set while the aircraft is on the ground). In various embodiments, under this scenario: (i) an ETD of 11:05:00 z is entered for the waypoint fix PXR; (ii) an RTA constraint of 11:25:00 z (Before) has been entered; (iii) the RTA time is shown in white (in an exemplary embodiment) as it is pilot defined while the RTA Speed (which is FMS computed) is shown in green (in an exemplary embodiment); and (iv) the aircraft is on target to meet the RTA as is shown with the green "On Time" Status (in an exemplary embodiment). Also in various embodiments, during this scenario, the user interface aspects include features wherein the most significant RTA data is shown in Compliance and Status at the top of the page. "RTA—Before:" (for example, which, in certain embodiments, shows the RTA constraint type (Before) as well as the time the pilot has defined for the RTA). Also in various embodiments, the ETA is calculated directly to the right of the RTA and the Status of the RTA is provided to the right of that value. Also in various embodiments, under this scenario, the RTA Speed (with the current POF) is located in the left column of the bottom read-only box along with the Current Min/Max RTA speed limits being applied.

With reference to FIG. 6, display screen 140 is depicted in accordance with a fifth scenario in which the RTA Summary tab 141 is engaged, with the aircraft on the ground and an on-time RTA defined, in accordance with various embodiments. In various embodiments, under this scenario: (i) an RTA (e.g., in an exemplary illustration, of 11:25:00 z) has been entered; (ii) the aircraft has an active Before RTA constraint (shown with the magenta time under "RTA—Before:"); (iii) the aircraft is in the cruise POF with a targeted RTA Speed (e.g., in one illustration, of 0.79 M, as shown with the magenta speed under "RTA Speed (Cruise):"); and (iv) the aircraft is on target to meet the RTA as is shown with the green "On Time" Status.

Figures 7, 8:
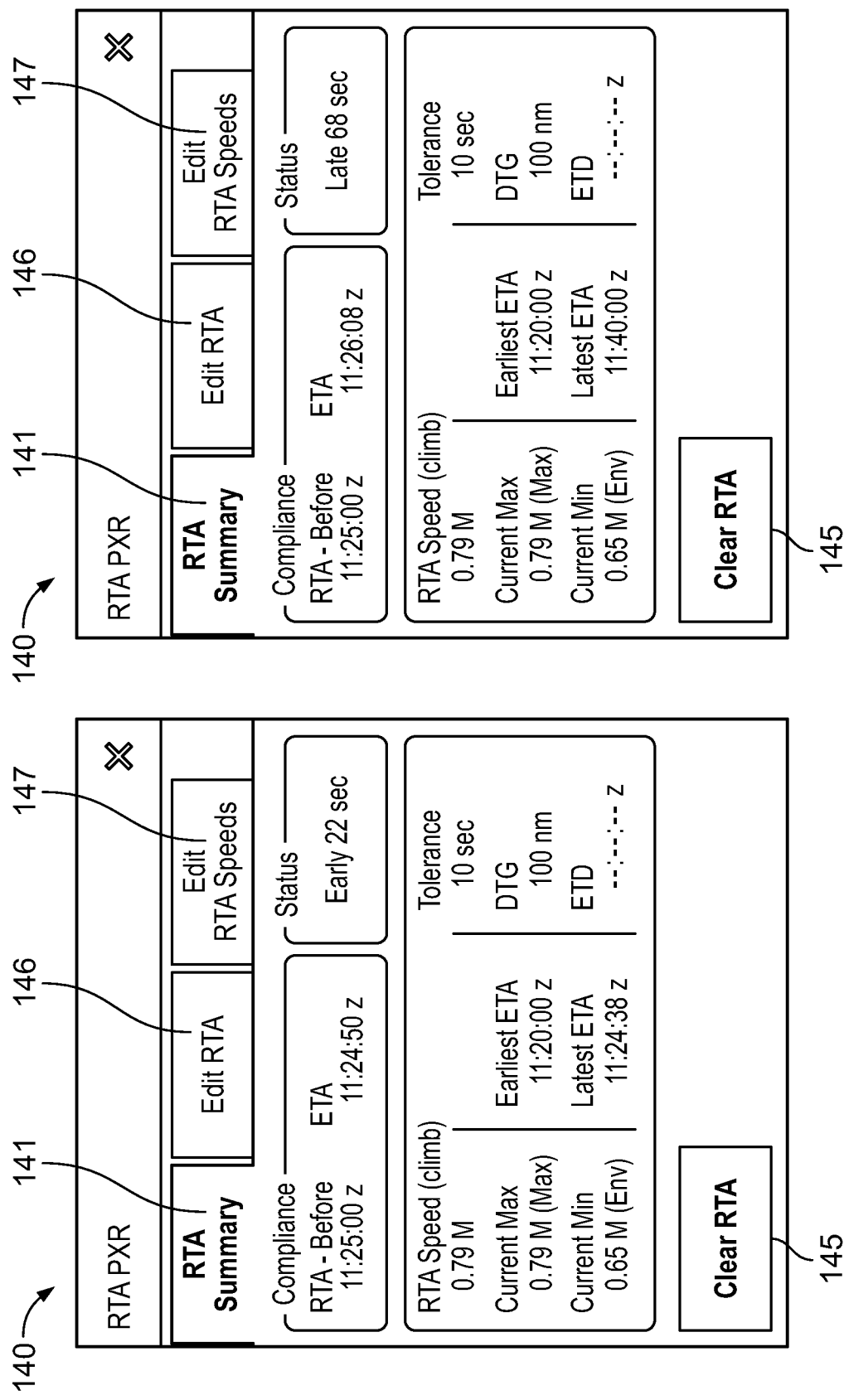

With reference to FIG. 7, display screen 140 is depicted in accordance with a sixth scenario in which the RTA Summary tab 141 is engaged, with the aircraft in the air, the RTA defined, and the in which the RTA cannot be met (due to the aircraft arriving early), in accordance with various embodiments. Specifically, in various embodiments, under this scenario: (i) an RTA constraint (e.g., of 11:25:00 z Before) has been entered; (ii) the aircraft is targeting but is unable to meet the RTA constraint (shown with the amber time under "RTA—Before:"); (iii) the aircraft's inability to meet the RTA is also indicated with the amber (e.g., "Early 22 sec") in certain embodiments (e.g., the Status only tells the pilot that they will arrive early, but by how much as well); and (iv) the aircraft's speed target is being limited by the Current Minimum speed, and as such cannot go slower in its current configuration. Also in certain embodiments, as depicted in FIG. 7, the RTA speed (with the current POF) is located in the left column of the bottom readable box along with the Current Min/Max RTA speed limits being applied.

With reference to FIG. 8, display screen 140 is depicted in accordance with a seventh scenario in which the RTA Summary tab 141 is engaged, with the aircraft in the air with an RTA defined and an RTA that cannot be met (due to the aircraft arriving late) in accordance with various embodiments. In various embodiments, under this scenario: (i) an RTA constraint (e.g., of 11:25:00 z Before) has been entered; (ii) the aircraft is targeting but is unable to meet the RTA constraint (shown with the amber time under "RTA—After"); (iii) the aircraft's inability to meet the RTA is also indicated with the amber (e.g., "Late 68 sec") Status which not only tells the pilot that they will arrive late, but by how much as well; and (iv) the aircraft's speed target is being limited by the Current Maximum speed, and as such cannot go faster in its current configuration. Also in certain embodiments, as depicted in FIG. 8, the RTA speed (with the current POF) is located in the left column of the bottom readable box along with the Current Min/Max RTA speed limits being applied.

Figure 9:
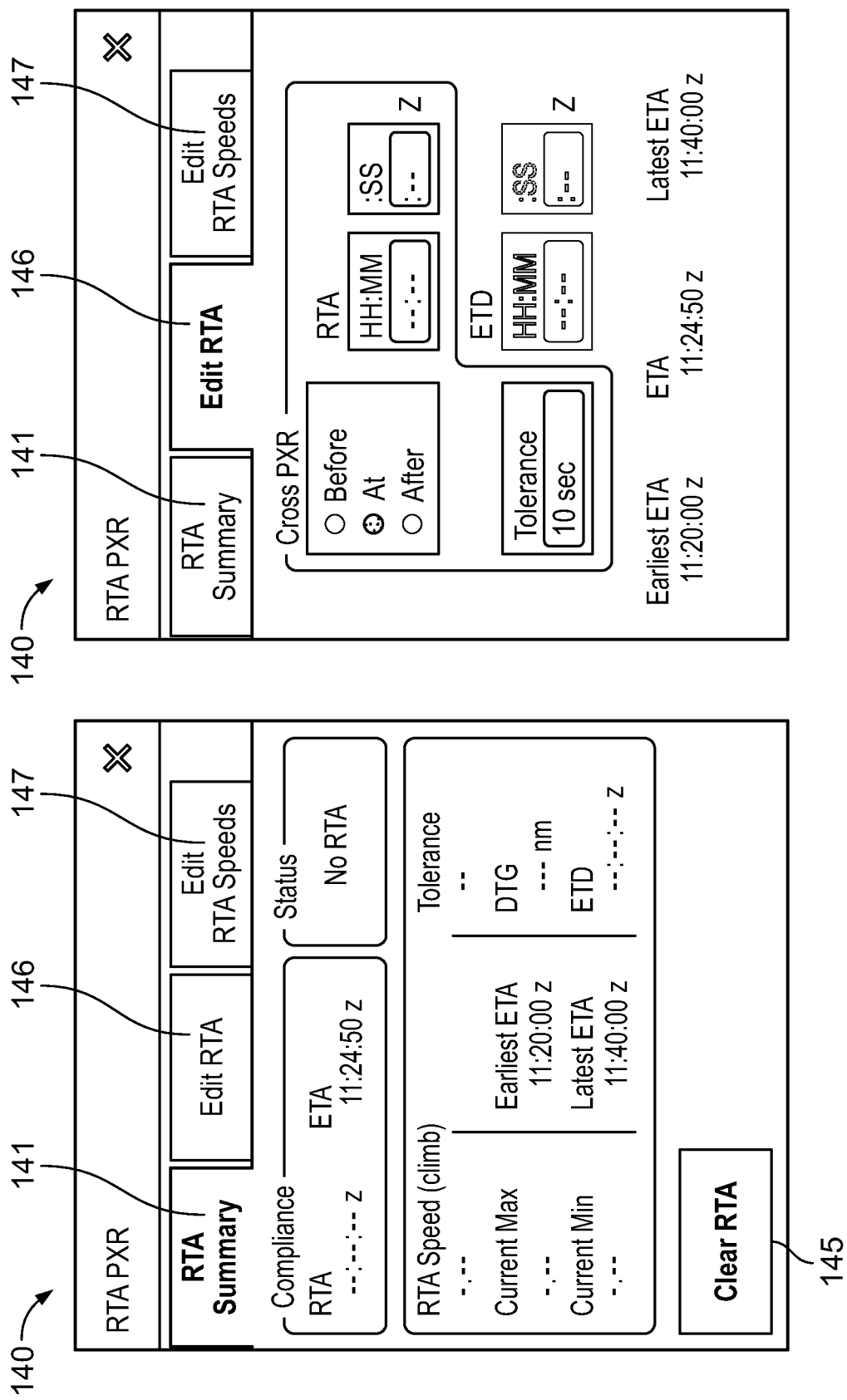

With reference to FIG. 9, display screens 140 of FIGS. 1B-1D are depicted in accordance with an exemplary embodiment, in an eighth scenario in which a user (e.g. a pilot and/or other operator of the aircraft) presses the "Edit RTA" button 146 of the display 140. In various embodiments, under this scenario, the Edit RTA tab 146 is open with no RTA defined. Also in various embodiments, during this scenario, the user interface aspects include features wherein (because the RTA is not defined) the only information that is shown is the default Tolerance of (e.g., ten seconds). In certain embodiments, the RTA constraint type defaults to an At constraint. Also in certain embodiments, the RTA constraint type can be defined as three different types, namely: (i) Before, (ii) At, and (iii) After. In certain embodiments, before is selected when the pilot wants to arrive at or before an entered RTA, At is selected when the pilot wants to arrive at an entered RTA with the only range being the tolerance, and After which is selected when the pilot wants to arrive at or after an entered RTA. Also in certain embodiments, to define an RTA, the pilot simply enters the constraining time into the RTA subsection and selects the wanted RTA constraint type. In certain embodiments, the RTA subsection is split into "HH:MM" and ":SS", for example to decrease pilot workload and the probability of error. In certain embodiments, the separation of hours and minutes from seconds allows the pilot to only enter an RTA with hours and minutes as defining features with the seconds defaulting to "00". Also in certain embodiments, this implementation may lower the risk that the pilot will forget to enter a "00" at the end of their entry. In addition, in certain embodiments, the application of an ETD would allow the FMS to calculate the ETA and the ETA window displayed at the bottom of the page.

With reference to FIG. 10, display screen 140 of FIGS. 1B-1D and FIG. 9 is depicted under a ninth scenario in which the aircraft is on the ground with no ETD or RTA being entered. In various embodiments, under this scenario, the Edit RTA tab is open with no RTA defined. Under this scenario, because the RTA is undefined, the only RTA information shown in s the default Tolerance (e.g., 10 seconds). Also under this scenario, in certain embodiments, the RTA constraint type may default to an "At" constraint. Also in certain embodiments, the RTA constraint type can be defined as three different types; Before, At, and After. Before is selected when the pilot wants to arrive at or before an entered RTA, At is selected when the pilot wants to arrive at an entered RTA with the only range being the tolerance, and After which is selected when the pilot wants to arrive at or after an entered RTA. Also in certain embodiments, in order to define an RTA, the pilot simply enters the constraining time into the RTA subsection and selects the wanted RTA constraint type. In addition, in certain embodiments, the RTA subsection is split into "HH:MM" and ":SS" (e.g., in order to decrease pilot workload and the probability of error). Also in certain embodiments, the separation of hours and minutes from seconds allows the pilot to only enter an RTA with hours and minutes as defining features with the seconds defaulting to "00". Also in various embodiments, because most RTA's follow this format with ground control wanting the aircraft to arrive at a specific minute, this implementation lowers the risk that the pilot will forget to enter a "00" at the end of their entry. Also as depicted in FIG. 10, in certain embodiments, the application of an ETD allows the FMS (e.g., the control system 1110 of FIG. 38) to calculate the ETA and the ETA window displayed at the bottom of the screen.

With reference to FIG. 11, display screen 140 of FIGS. 1B-1D and FIG. 9 is depicted under a tenth scenario in which: (i) the Edit RTA Tab 146 is open with no RTA defined; and (ii) the aircraft is in the air with no ETD or RTA defined (or on the ground with an ETD defined). In various embodiments, under this scenario, the FMS (e.g., the control system 1110 of FIG. 38) calculates the Earliest ETA, the ETA, and the Latest ETA as is shown at the bottom of the page. Also in various embodiments, during this scenario, the user interface aspects include features wherein the "Earliest ETA", "ETA", and "Latest ETA" at the bottom of the page display the most relevant information to the pilot while edits are being made. In various embodiments, this information is dependent on ETD, so ETD either needs to be defined or the aircraft needs to be airborne to define these calculations.

Figure 12:
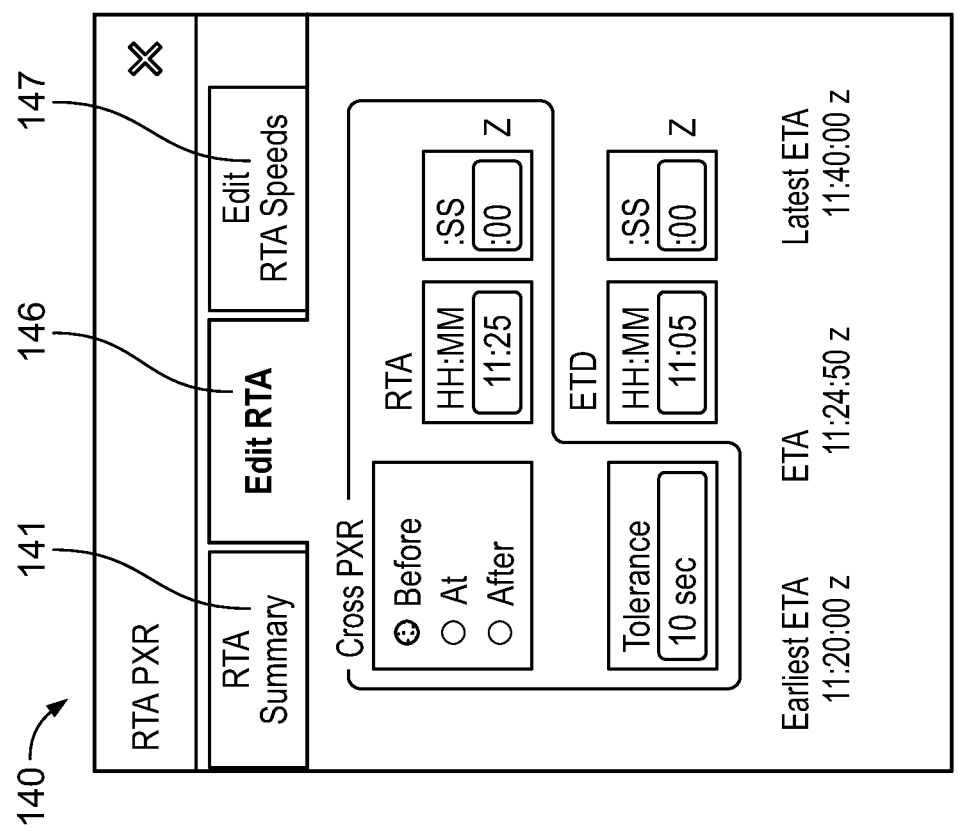

With reference to FIG. 12, display screen 140 of FIGS. 1A-1D and FIG. 9 is depicted under an eleventh scenario in which: (i) the Edit RTA tab is open with RTA defining features entered; (ii) the pilot has selected a Before constraint with a default (e.g., 10 second) tolerance; and (iii) an RTA (e.g., of 11:30 z) was entered, note that the pilot was not forced to enter the seconds when defining this. The pilot also used the same procedure to define an ETD (e.g., of 11:05 z).

Figure 13:
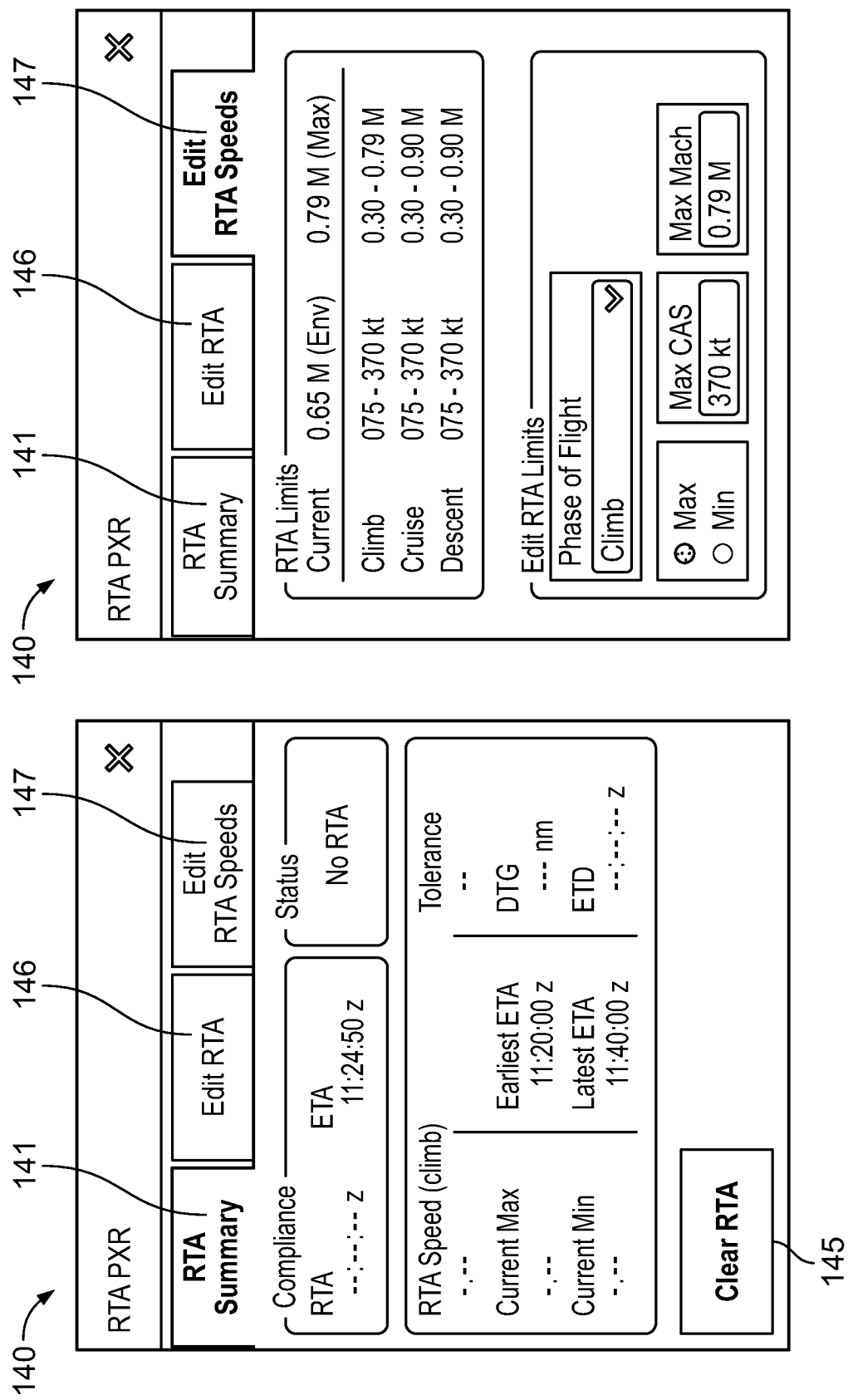

With reference to FIG. 13, display screen 140 of FIGS. 1B-1D is depicted in connection with a twelfth scenario in which the Edit RTA Speeds tab 147 is open with its default layout when no RTA is defined. In various embodiments, the display screen 140 includes various RTA limits (such as current, climb, cruise, and descent). Also in various embodiments, display screen 140 also includes a Clear RTA tab 145.

Figures 14, 15:
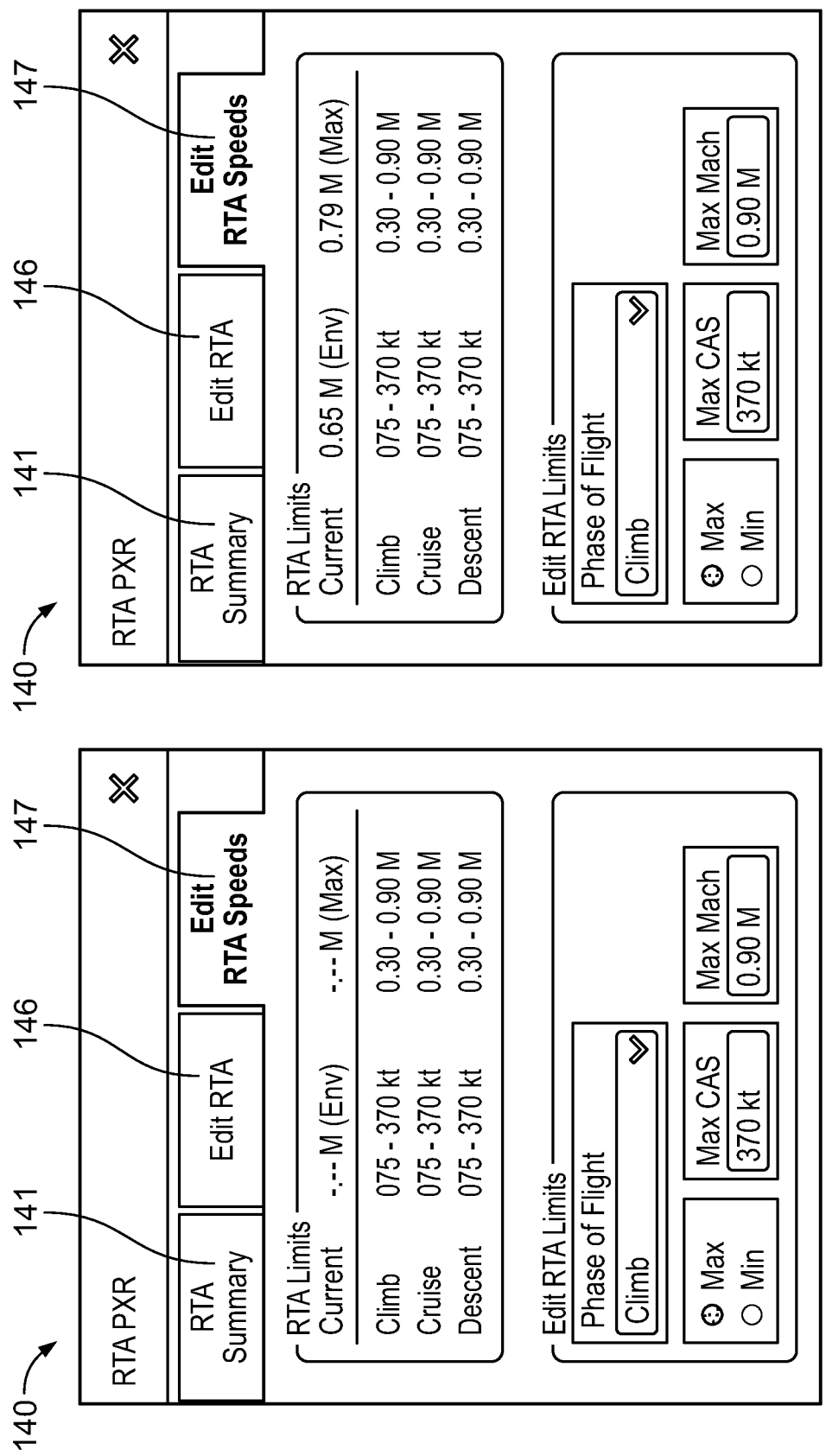

With reference to FIG. 14, a default display is provided for display screen 140, in accordance with a thirteenth scenario, representing the scenario of FIG. 13, and further wherein a default display is required with no RTA defined. In various embodiments, during this scenario, the user interface for the display aspects include features wherein the top of the RTA Limits table on the top of the page gives the pilot a view of the current RTA limits they are being constrained by. Also in this embodiment, because the aircraft has no RTA defined, this appears blank. Also in this embodiment, below the current RTA limits is the pilot defined limits for each POF that can be edited using the editable field on this page. Also in this embodiment, in order to edit these limits, the pilot simply works with the Edit RTA Limits box; defining what phase of flight they would like to edit, whether they want to edit a maximum or minimum limit, and entering whatever CAS or Mach value is needed. Also in various embodiments, information on this page is automatically applied to the flight plan. In various embodiments, this is performed, for example, because certain of the information editable here and/or other information can be edited on the Autospeeds tab whose data edits, due to flight deck philosophy, needs to be automatically applied to the flight plan. In certain embodiments, the auto speeds tab allows the user to edit an RTA constraint (e.g., speeds, time, and/or the like) after an RTA constraint has been created in INAV or the Waypoint List. In various embodiments, the user (e.g., pilot) cannot create a new RTA constraint in the Autospeeds tab, but can edit the RTA constraint in the Autospeeds tab).

Also in certain embodiments, this information may be optional, and the pilot may not need to edit or enter this information to work with the RTA.

With reference to FIG. 15, display screen 140 is depicted in connection with a fourteenth scenario in which: (i) the Edit RTA Speeds tab is open with its default layout when in flight with an RTA; and (ii) the limit reason for the Current RTA Speed Limits (e.g., 0.65 M and 0.90 M) are shown next to the speeds. In certain embodiments, in this example, the minimum limit reason is the envelope speed and the maximum limit reason is the maximum allowable speed. In certain embodiments, minimum RTA operating speeds may be limited, for example, due to: (i) minimum envelope speed (ENV); (ii) maximum endurance speed (END); and (iii) RTA minimum speed (MIN). Also in various embodiments, the maximum RTA operating speeds may be limited by: (i) maximum envelope speed (ENV) and RTA maximum speed (Max). Also in various embodiments, during this scenario, the user interface aspects include features wherein the units on the Current RTA speed limits are set to the units that are currently being targeted in the flight plan.

Figure 16:
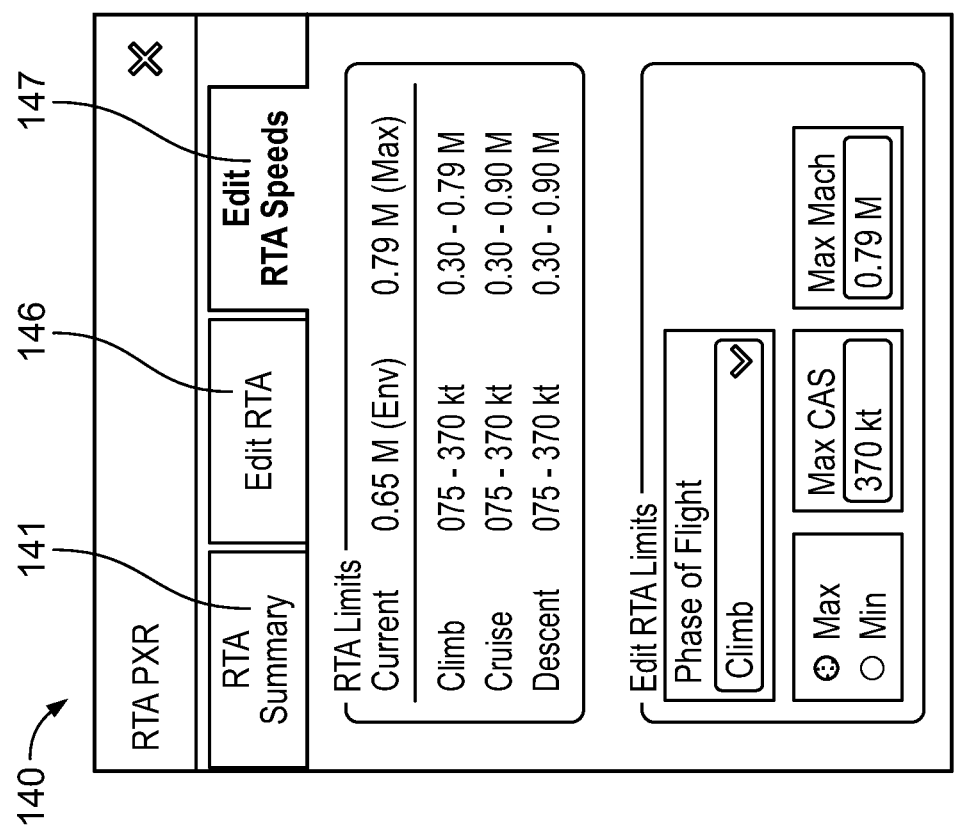

With respect to FIG. 16, display screen 140 is depicted in connection with a fifteenth scenario with an edited display in which the RTA is defined. Specifically, in this scenario, in certain embodiments, the Edit RTA Speeds tab is open with a custom value defined for the maximum Mach value the pilot would like the FMS to target when flying RTA speeds in the climb POF. Also in various embodiments, during this scenario, the user interface aspects include features wherein, below the current RTA limits is the POF RTA limits that can be edited using the editable field on the user interface.

With reference to FIG. 17, an additional display 1700 is depicted in connection with a sixteenth scenario in which no RTA is entered (e.g., in which the aircraft is flying a general flight and is currently in cruise targeting long range cruise speeds). Also in various embodiments, during this scenario, the user interface aspects include features wherein: (i) the bottom left corner of this page displays RTA information if defined (e.g., in which the RTA fix, the RTA speed, and the current RTA speed limits); and (ii) the first section of the Auto Speeds page provides the pilot with a readable view of all data that can be edited in the Auto Speeds tab. Also in various embodiments, to edit the information described here, the pilot simply swipes to the right and finds the section they want to edit. In addition, also in various embodiments, the edit pages are set up based on flight phase, with Departure editable first, followed by Climb, Cruise, Descent, Approach Speeds, Limits, and finally the Required Time of Arrival limits section. Also in various embodiments, under this scenario, at the bottom of the display four dots are present. In various embodiments, each of these dots represents a separate section of the Auto Speeds tab. In addition, in various embodiments, to scroll to an adjoining section, the user simply swipes to the left/right.

With reference to FIG. 18, the additional display 1700 is depicted in connection with a seventeenth scenario in which no RTA is entered; however, the RTA Limits can still be edited at the far right side of the Auto Speeds tab. Also in various embodiments, during this scenario, the user interface aspects include features wherein: (i) the top of the RTA Limits table provides the pilot a view of the current RTA limits they are being constrained by (because the aircraft has no RTA defined, this appears blank in certain embodiments); and (ii) below the current RTA limits is the pilot defined limits for each POF that can be edited using the editable field on the user interface. In certain embodiments, the information on the user interface in this scenario is automatically applied to the active flight plan. For example, in certain embodiments, due to flight deck philosophy, all information on the Auto Speeds tab is automatically applied to the active flight plan. Also in certain embodiments, the RTA Limits are available on both the Edit RTA Limits dialog box and the Auto Speeds tab to give pilots multiple points of entry given some pilots would expect speed related data to appear on the Auto Speed tab while others would expect the data to appear on the RTA dialog box.

With reference to FIG. 19, the additional display 1700 is depicted in connection with an eighteenth scenario in which an RTA is entered at waypoint PXR down path of the aircraft, and the aircraft is currently in climb targeting RTA speeds. In certain embodiments, all speed modes are set to RTA in this scenario. Also in various embodiments, during this scenario, the user interface aspects include features wherein: (i) the aircraft is targeting (e.g., at 0.79 M) due to the Limit (as is shown under Limits (Climb)); (ii) Waypoint PXR is not the current active leg and won't be sequenced until later in the flight plan. Hence PXR is displayed in white (in certain embodiments); and (iii) because RTA speeds are being actively flown, the "Speed:" value displayed is magenta (in certain embodiments).

With reference to FIGS. 20 and 21, multiple screens showing the additional display 1700 are provided in connection with a nineteenth scenario in which an Auto Speeds 2000 tab has drop down menus to select the speed mode for each flight phase. For example, in certain embodiments, when an RTA is applied to the flight plan, the drop downs auto-select RTA speed modes. However the pilot is free to customize when it is desired to target RTA speeds. Also in certain embodiments, an active RTA speed is displayed in magenta under the associated phase of flight (e.g. Climb Speed=0.79 M).

With reference to FIG. 22, the additional display 1700 is illustrated in connection with a twentieth scenario in which: (i) an RTA is entered at waypoint PXR down path of the aircraft (e.g., resulting in the current RTA Limits being filled in on the user interface); and (ii) the pilot has edited the maximum Mach climb RTA speed limit which is currently in use.

With reference to FIG. 23, the additional display 1700 is illustrated in connection with a twenty-first scenario in which an RTA is entered at waypoint PXR down path of the aircraft. For example, in certain embodiments, the aircraft is currently targeting RTA speeds and is in the cruise POF. PXR is shown in magenta in the bottom left corner of the user interface indicating that the current active leg leads into the RTA fix. Also in various embodiments, during this scenario, the user interface aspects include features wherein the aircraft's speed is not being limited by the RTA speed limits.

With reference to FIG. 24, the additional display 1700 is illustrated in connection with a twenty-second scenario in which an RTA is entered at waypoint PXR down path of the aircraft. For example, in certain embodiments, this may have resulted by the current RTA Limits being filled in as is shown to the right, with all selections being defaulted.

With reference to FIG. 25, the additional display 1700 is illustrated in connection with a twenty-third scenario in which: an RTA is entered at waypoint PXR down path of the aircraft. For example, in certain embodiments, the aircraft is currently in cruise, targeting Long Range Cruise speeds, and no speed mode is set to RTA. Also in certain embodiments, this causes the RTA to exist but not be targeted. In addition, in certain embodiments, in order to enter this situation, the pilot would have to manually change the speed modes for each POF away from RTA speeds. Also in various embodiments, during this scenario, the user interface aspects include features wherein: (i) the bottom left corner of the user interface displays general RTA speed information (e.g., specifically the RTA fix, the RTA speed, and the current RTA speed limits); (ii) because the aircraft has an RTA entered at PXR, that waypoint is shown in white indicating that it is not being actively targeted; and (iii) the Limits are also shown but not being actively held to (e.g., that the aircraft is flying at 0.8 M which is above the Current RTA Limit of 0.79 M).

With reference to FIG. 26, the additional display 1700 is illustrated in connection with a twenty-fourth scenario in which an RTA is entered at waypoint PXR down path of the aircraft. In various embodiments, this may have resulted in the current RTA Limits being filled in as is shown to the right. Also in various embodiments, in this situation, the pilot has edited the maximum Mach climb RTA speed limit. However, also in various embodiments, because the pilot is in the cruise POF, it has no effect on the current flight state.

With reference to FIGS. 27-37, illustrations are provided for the display 100 of FIG. 1 and the additional display 1700 of FIG. 17 in various exemplary implementations and scenarios, in order to provide further details as to the overall user workflow in accordance with exemplary embodiments, including with respect to how a user creates an RTA constraint on a waypoint, and how the RTA constraint is then displayed in the INAV (map), WayPoint List, and VDS (below INAV) window applications in accordance with various embodiments.

Figure 27:
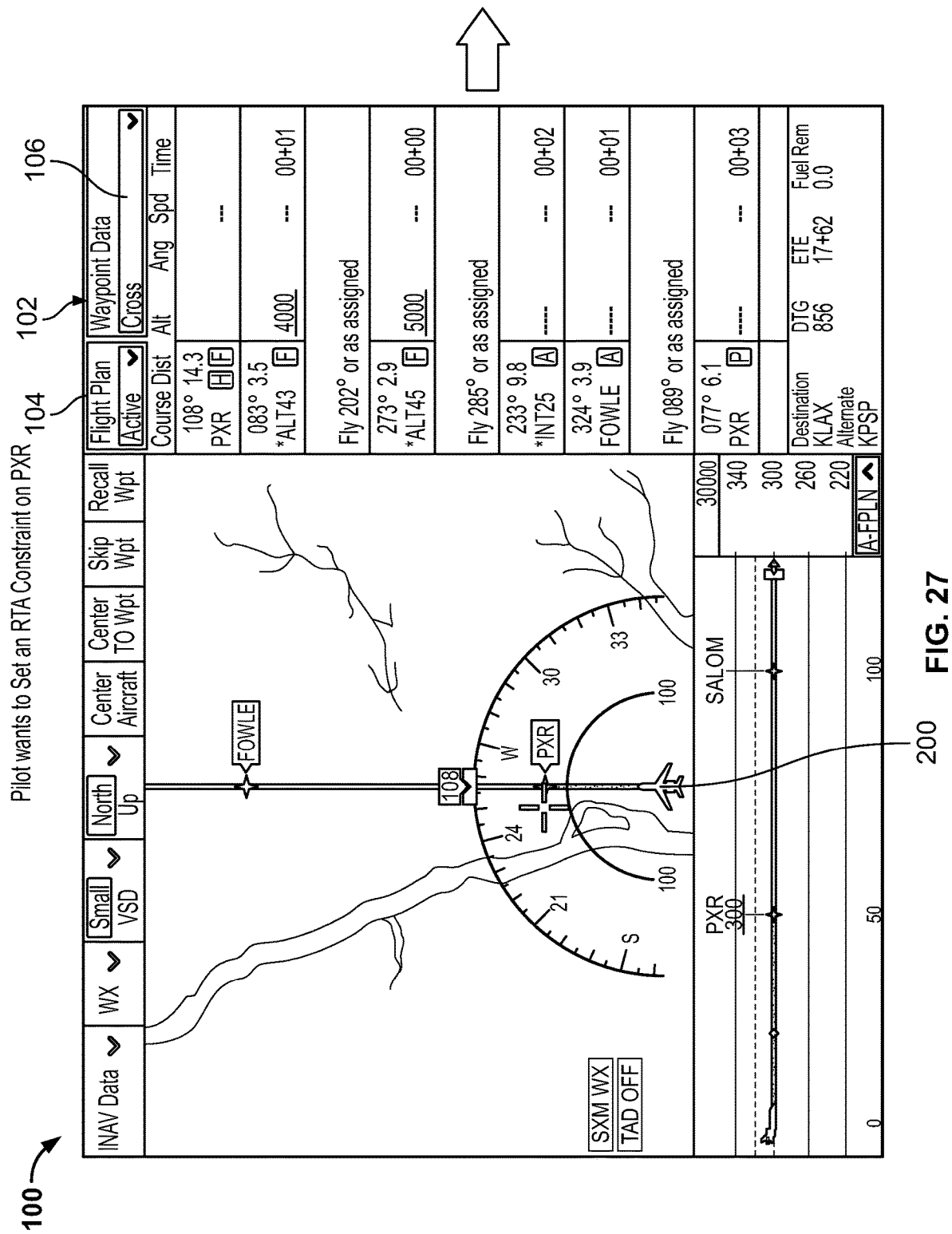

By way of example, FIG. 27 depicts the display 100 in accordance with a scenario in which the user (e.g., pilot) desires to set an RTA constraint on PXR, in accordance with an exemplary embodiment.

Figure 28:
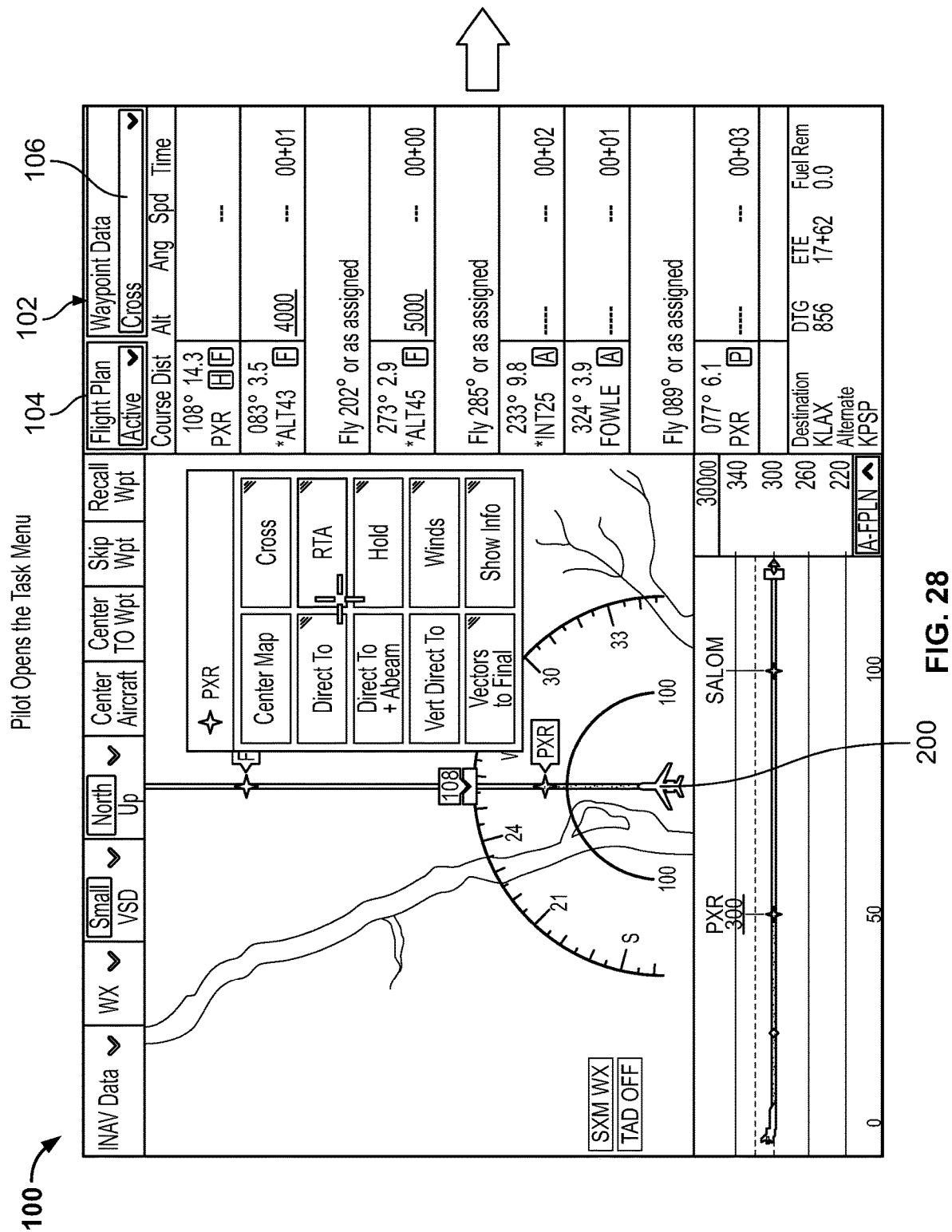

By way of continued example, FIG. 28 depicts the display 100 in accordance with a scenario in which the user (e.g., pilot) opens the task menu from the display 100 of FIG. 27.

Figure 29:
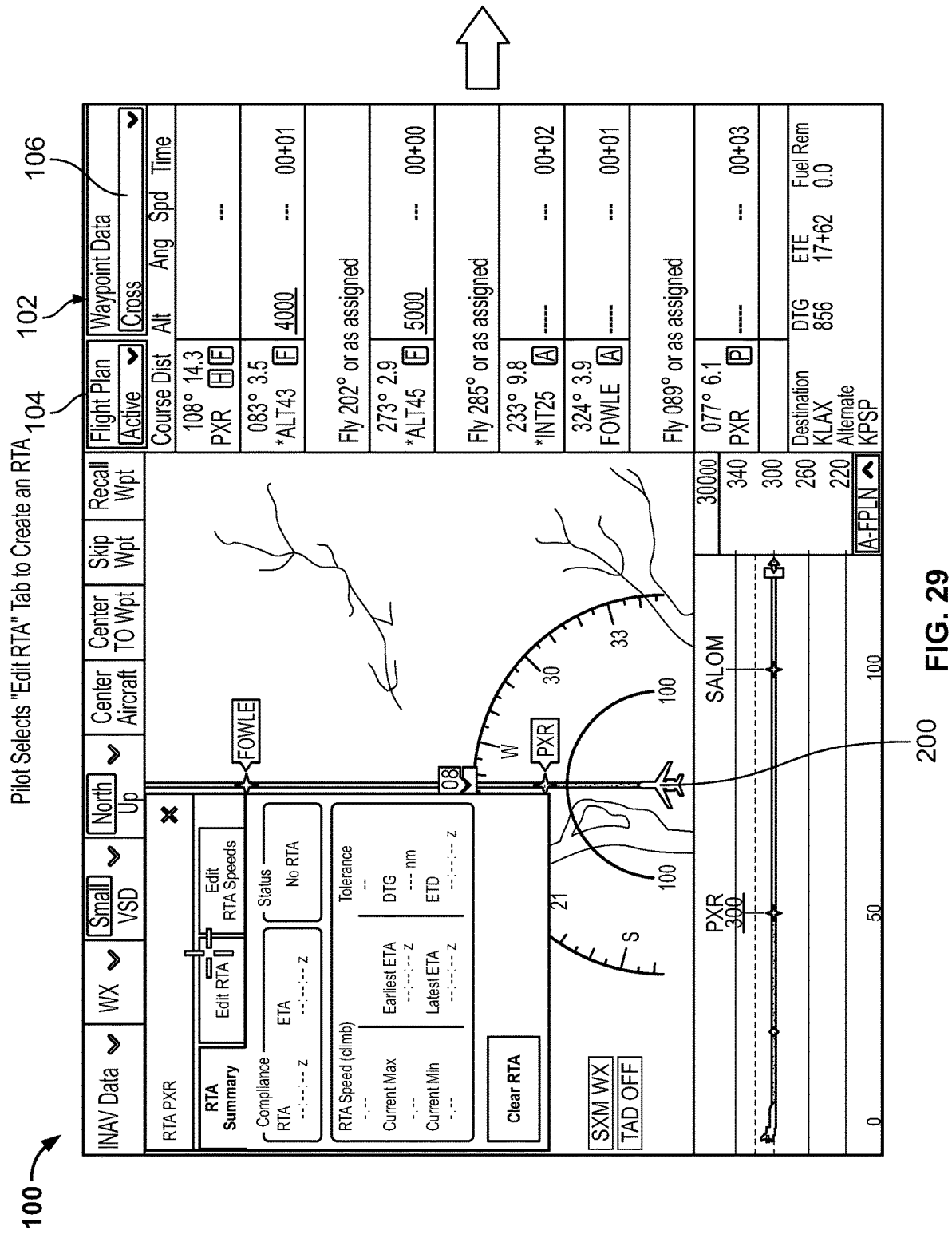

By way of further continued example, FIG. 29 depicts the display 100 in accordance with a scenario in which the user (e.g., pilot) has opened the task menu as shown in FIGS. 27 and 28, and further in which the user (e.g., pilot) selects the "Edit RTA" tab in order to create an RTA.

Figure 30:
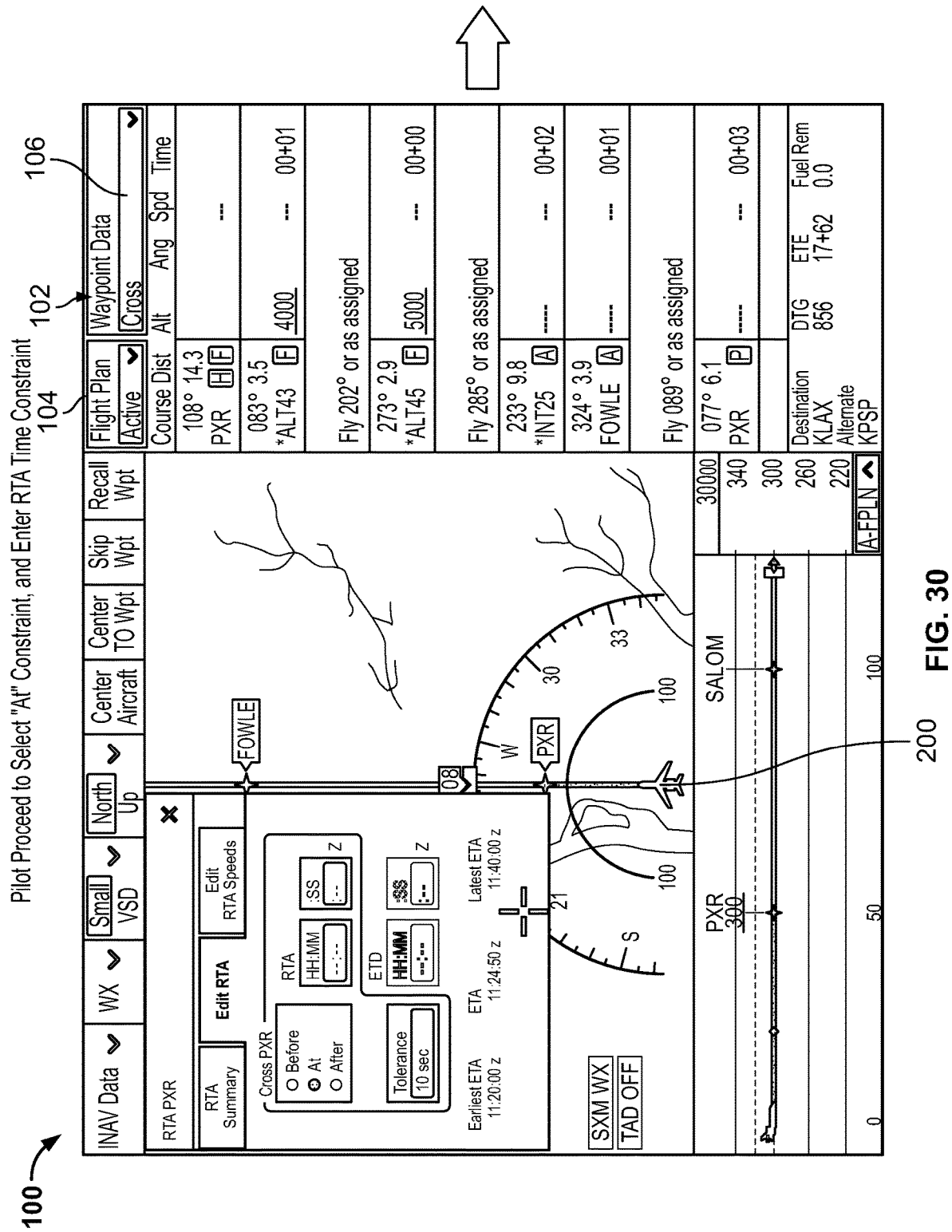

By way of additional example, FIG. 30 depicts the display 100 in accordance with another scenario in which the user (e.g., pilot) proceeds to select an "At" constraint, and enters an RTA time constraint.

Figure 31:
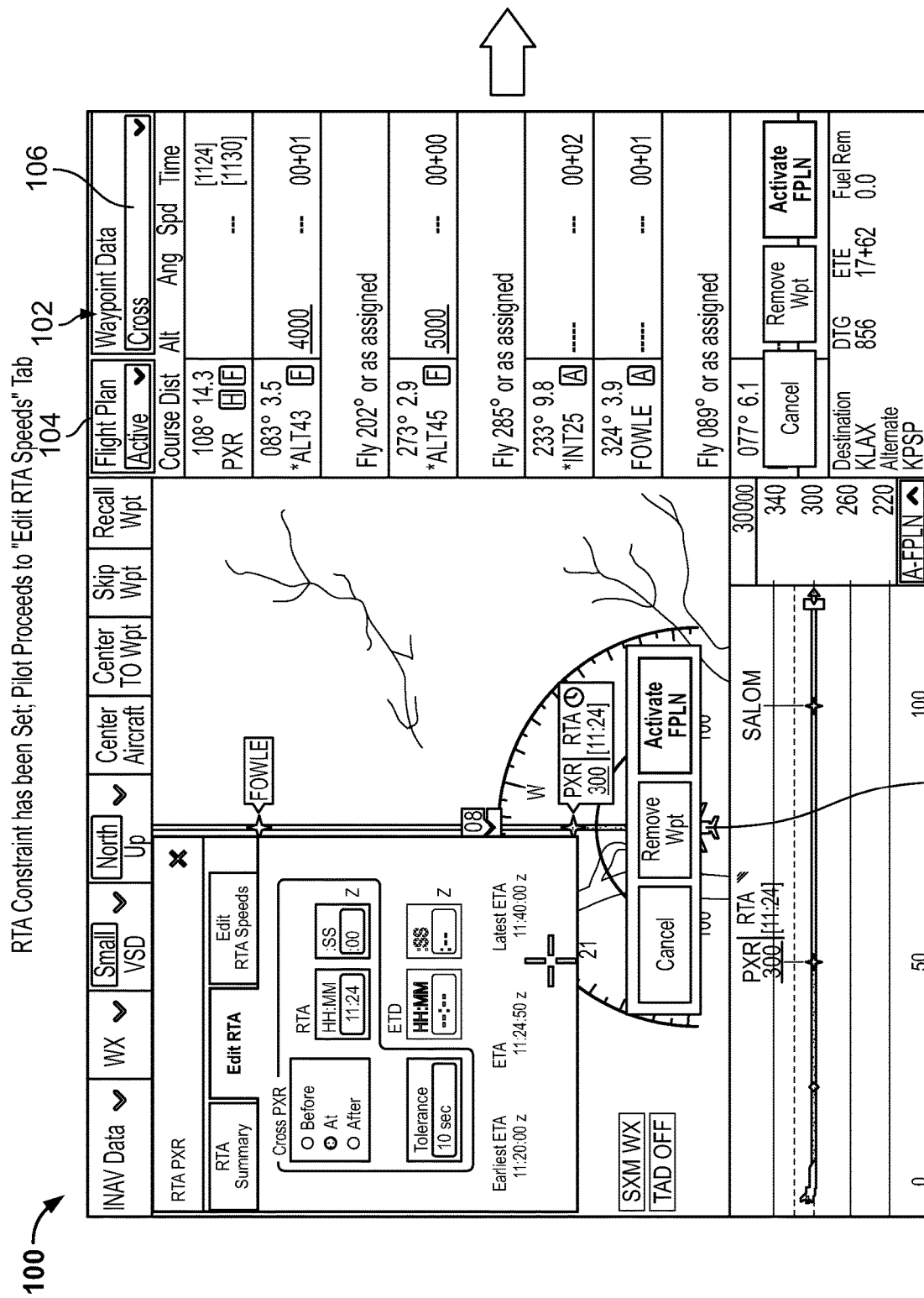

By way of continued example, FIG. 31 depicts the display 100 in accordance with a scenario in which the user (e.g., pilot) has selected the "At" constraint as shown in FIG. 30, and further in with the RTA constraint has been set, and in which the user (e.g., pilot) proceeds by selecting the "Edit RTA Speeds" tab.

Figure 32:
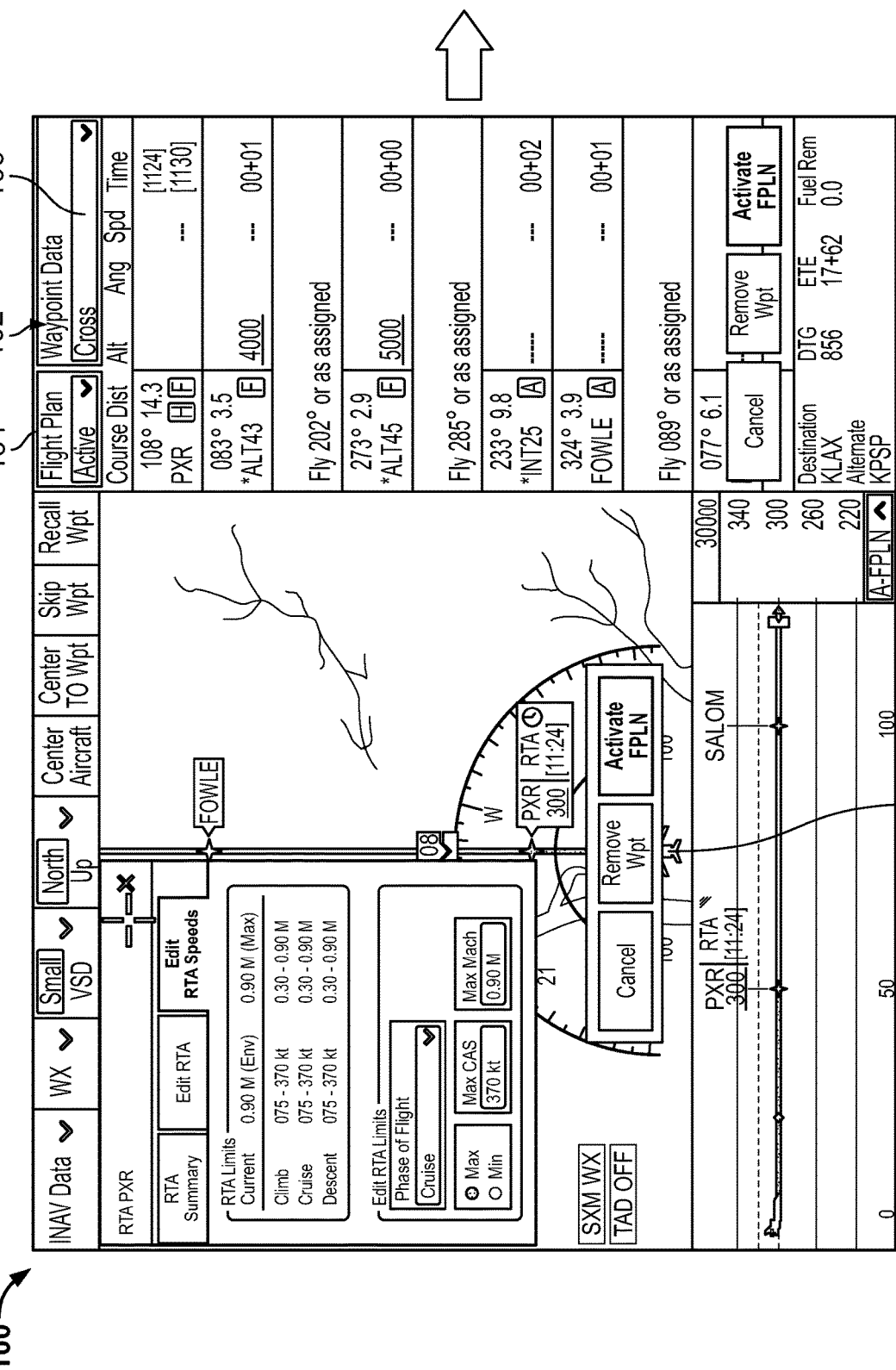

By way of further continued example, FIG. 32 depicts the display 100 in accordance with a scenario (building upon the scenario of FIGS. 30 and 31) further in which the user (e.g., pilot) double checks the calculated speeds. In various embodiments, as depicted in FIG. 32, the user (e.g., pilot) can manually adjust "Phase of Flight", "Max CAS" (e.g., Maximum Calculated Air Speed), and "Max Mach" (e.g., "Machine Mach", with "Mach" being a measure of speed, with one "Mach" being equal to breaking the sound barrier). Also as used throughout, the abbreviations "Env" may refer to "Envelope", "Max" may refer to "Maximum", "Min" may refer to "Minimum", and so on. Also in various embodiments, as depicted in FIG. 32, a decision is entered as to whether the default calculated settings are sufficient. In addition, in certain embodiments, Default values (e.g., displayed in green) are calculated by the FMS computer; however, the user (e.g., pilot) may change these defaults (within certain boundaries of the aircraft limitations) when selecting a Phase of Flight and changing the Maximum and/or Minimum limits of the CAS or Mach. Also in certain embodiments, once the user (e.g., pilot) makes a manual change, the associated "calculated" values will turn white to denote they are based on manually data entries (e.g., via instructions provided by the processor). Also in certain embodiments, one or more different color schemes may also be implemented.

Figure 33:
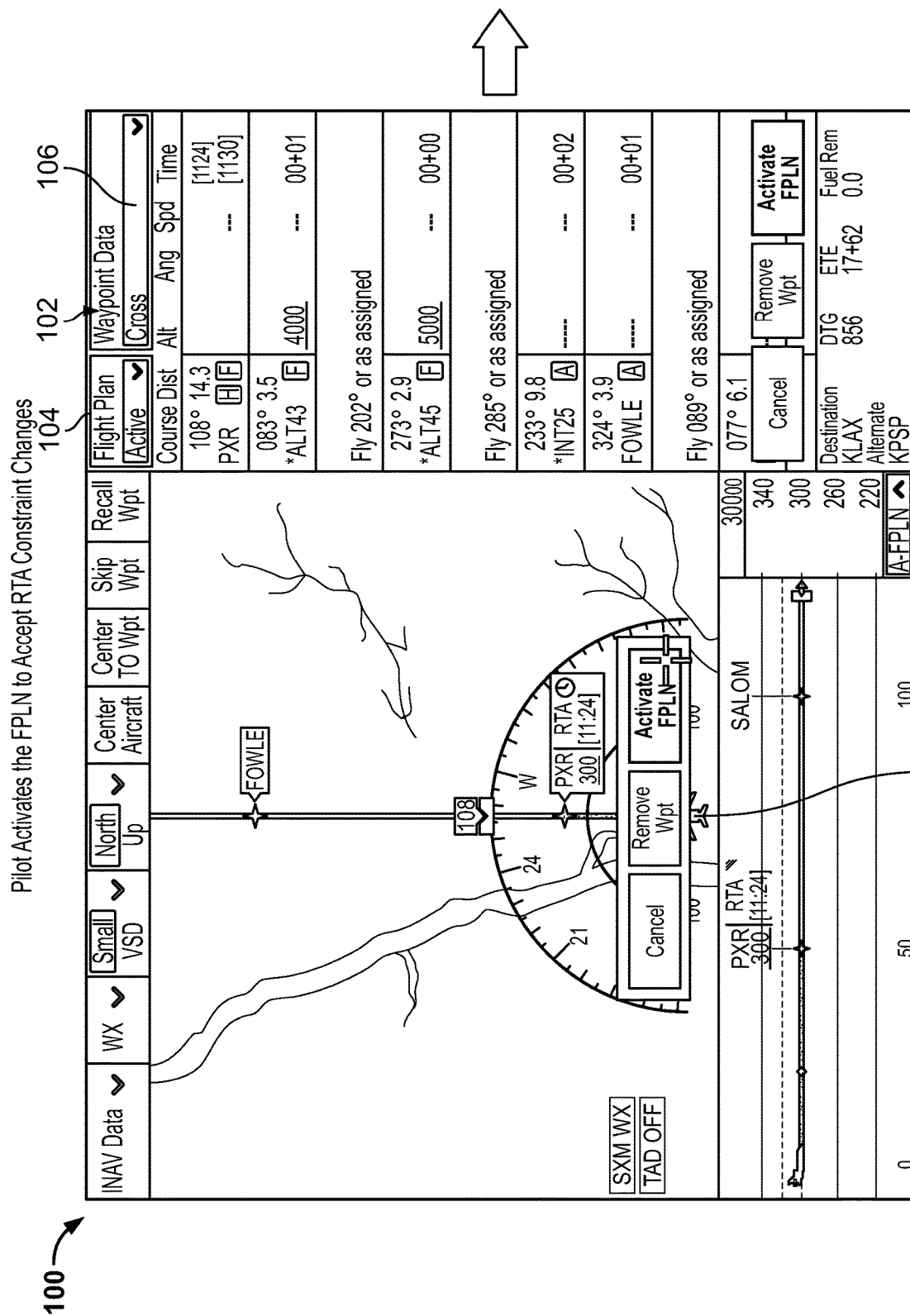

By way of additional example, FIG. 33 depicts the display 100 in accordance with another scenario in which the user (e.g., pilot) activates the FPLN (e.g., flight plan) to accept the RTA constraint changes, in accordance with an exemplary embodiment.

By way of continued example, FIG. 34 depicts the display 100 in accordance with a scenario (building upon FIG. 33) in which the vehicle (e.g., aircraft) is now targeting and flying to the waypoint with RTA constraints and speed, and in which the display 100 sows the users (e.g., pilot and/or other flight crew) that the aircraft is "on time to meeting the constraint), in accordance with an exemplary embodiment.

By way of further continued example, FIGS. 35A and 35B depict the additional display 1700 in accordance with a scenario (building upon the scenario of FIGS. 33 and 34) further in which: (i) in the "Auto Speeds" tab of the Avionics window application, the Cruise Speed for the Cruise phase of flight has been automatically updated to reflect the RTA constraint and required speeds to meet the constraint (FIG. 35A); and (ii) the user (e.g., pilot) can swipe to the "Cruise" section of the Auto Speeds tab to see that the RTA constraint is active (FIG. 35B), in accordance with an exemplary embodiment.

Figure 36:
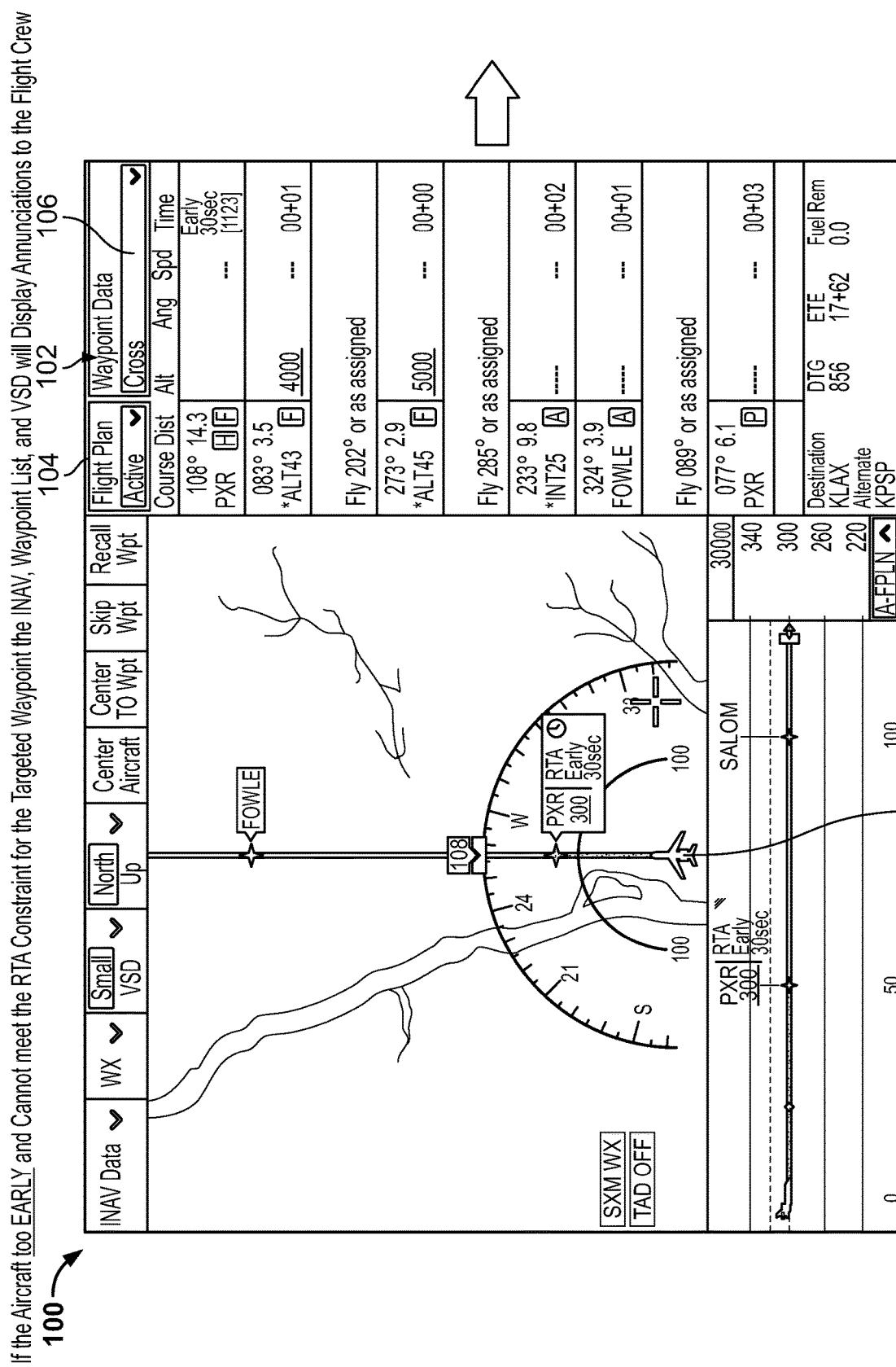

By way of additional example, FIG. 36 depicts the display 100 in accordance with a scenario in which the vehicle (e.g., aircraft) is too early and cannot meeting the RTA constraint for the targeted waypoint. As illustrated in FIG. 36, in accordance with an exemplary embodiment, the INAV, Waypoint List, and VSD will display annunciations to the users (e.g., the pilot and/or other flight crew), including with a notification that the vehicle (e.g., aircraft) is "EARLY".

Figure 37:
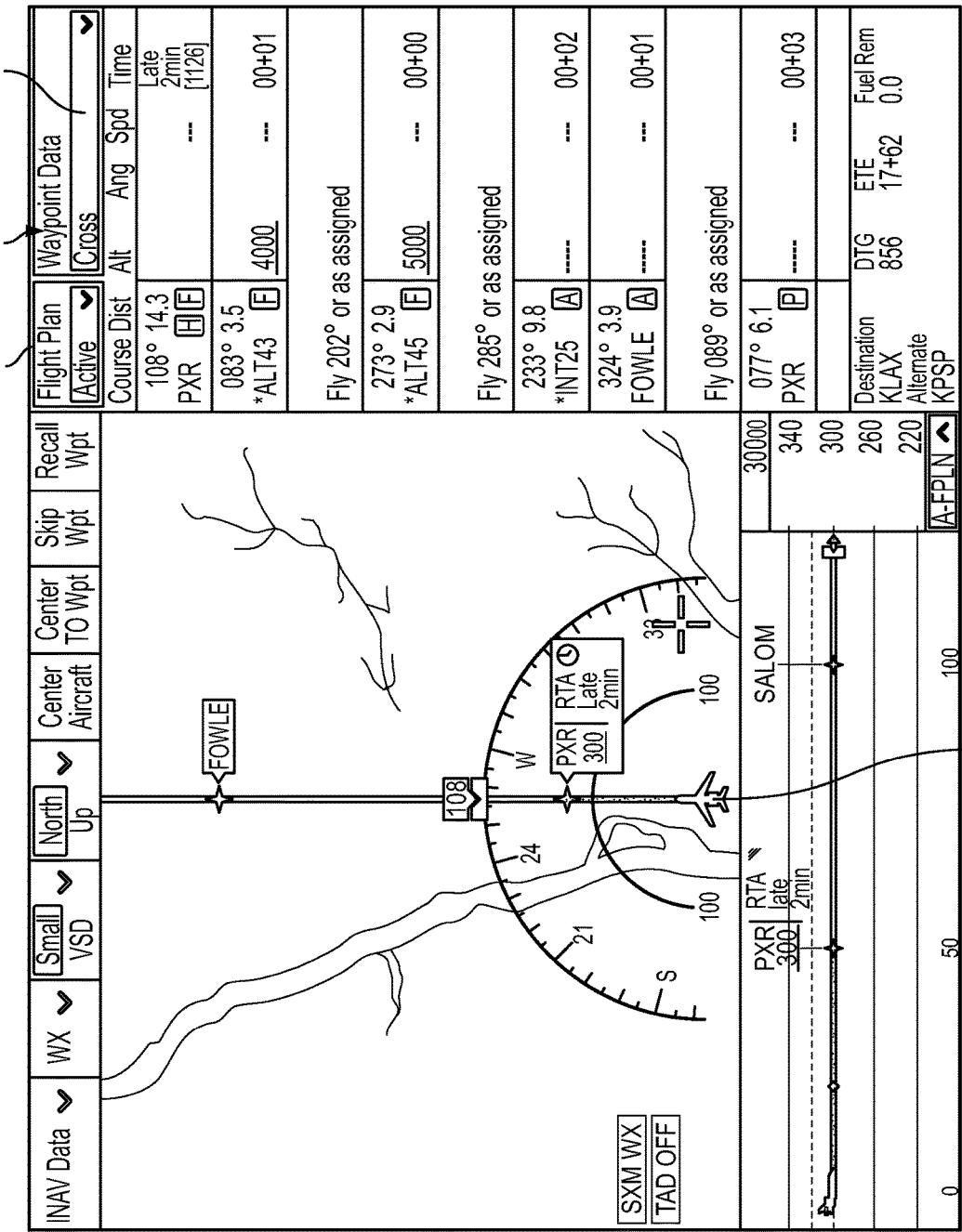
Figure 38:
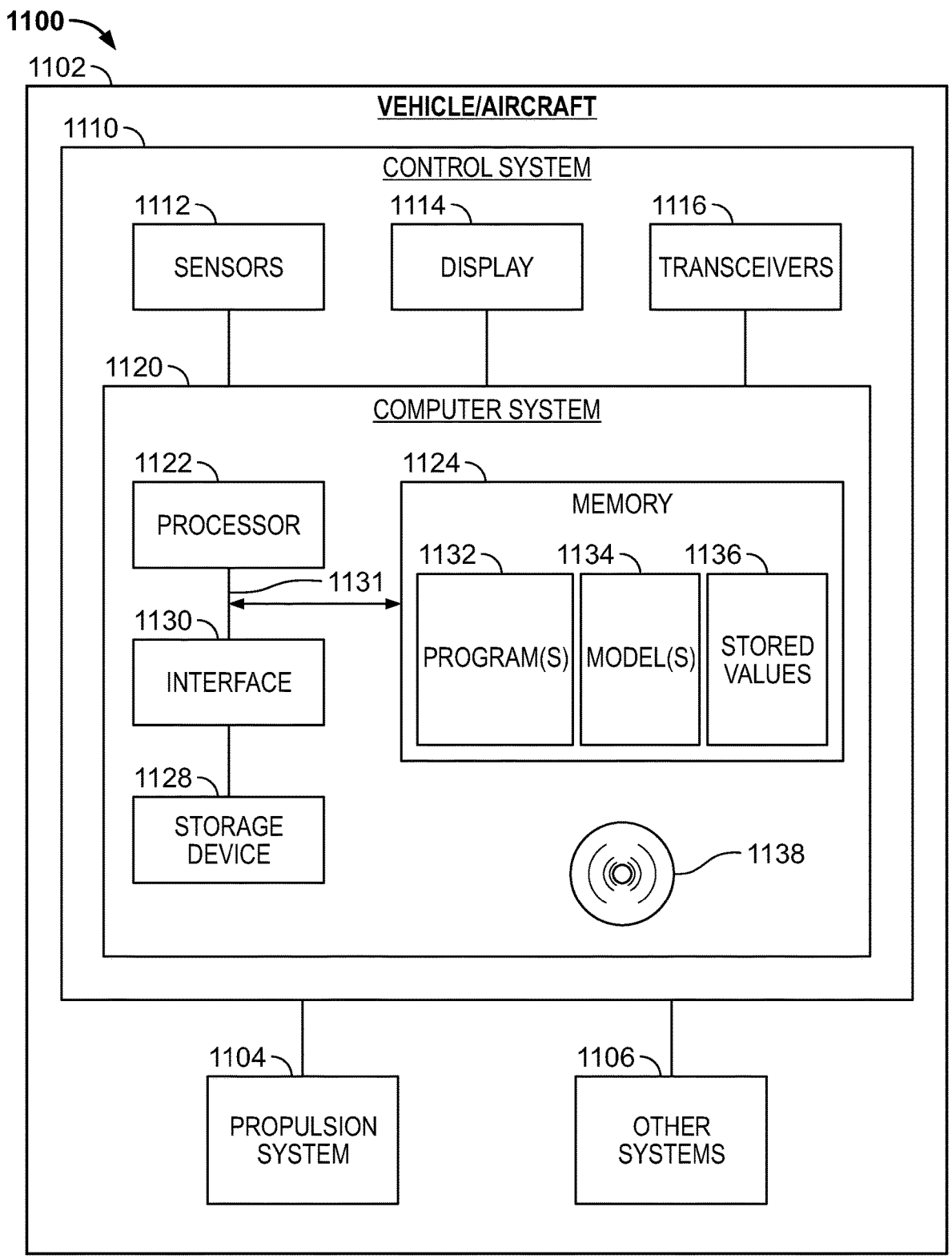
FIG. 38 illustrates a vehicle (e.g., aircraft), including a control system thereof, in which the display and workflow functionality of FIG. 1A and the implementations of FIGS. 1B-1D, 2-34, 35A, 35B, and 36-37 may be employed and implemented, in accordance with an exemplary embodiment.

By way of another additional example, FIG. 37 depicts the display 100 in accordance with a different scenario in which the vehicle (e.g., aircraft) is too late and cannot meeting the RTA constraint for the targeted waypoint. As illustrated in FIG. 37, in accordance with an exemplary embodiment, the INAV, Waypoint List, and VSD will display annunciations to the users (e.g., the pilot and/or other flight crew), including with a notification that the vehicle (e.g., aircraft) is "LATE".

As noted above, in various embodiments, the display 100 of FIG. 1A, and associated methods, systems, workflow, functionality and implementations of FIGS. 1B-1D and FIGS. 2-37, may be implemented in connection with a vehicle 1100, including a control system 1110 thereof, as illustrated in FIG. 38 in accordance with an exemplary embodiment.

With reference to FIG. 38, in certain embodiments, the vehicle 1100 comprises an aircraft an aircraft. However, similar to the discussion above, in certain other embodiments, the vehicle 1100 may also comprise one or more other vehicles (such as an automobile, locomotive, marine vehicle, spacecraft, and so on) and/or one or more other types of mobile platforms.

In various embodiments, the vehicle 1100 (e.g., aircraft) includes a body 1102, a propulsion system 1104, and the above-referenced control system 1110. In various embodiments, the vehicle 1100 may also include various other systems 1106, such as one or more communications systems, environmental control systems, and so on.

In various embodiments, the propulsion system 1104 provides movement for the vehicle 1100, including the body 1102 thereof. In certain embodiments, the propulsion system 1104 may include one or more engines, actuators, steering mechanisms, landing gears, and various other systems. In various embodiments, the propulsion system 1104 and other systems 1106 are controlled by the control system 1110.

As depicted in FIG. 38, in various embodiments, the control system 1110 includes a sensor array 1112 along with a display 1114, transceivers 1116, and computer system 1120. In various embodiments, the sensor array 1112 includes various sensors pertaining to the vehicle 1100 (e.g., aircraft) and its surroundings, such as speed sensors, altitude sensors, and so on. Also in various embodiments, the display 1114 provides visual displays (and in certain embodiments, audio, haptic, and/or other displays) for the pilots and/or operators of the vehicle 1100, including the information provided in the display 100 of FIG. 1A and the various implementations of FIGS. 1B-1D and FIGS. 2-37. Also in various embodiments, the transceivers 1116 send and receive information between the vehicle 1100 and one or more remote entities (e.g., control towers and the like), including information as to the RTA, vehicle and geographic data, flight paths, environmental conditions, and so on.

Also as depicted in FIG. 38, in various embodiments, the computer system 1120 controls operation of the vehicle 1100, including the propulsion system 1104 and other systems 1106 thereof. In various embodiments, the computer system 1120 is coupled to, communicates with, receives data from, and controls operation of the sensor array 1112, display 1114, and transceivers 1116. In addition, in various embodiments, the computer system 1120 controls the display 100 and implementations of FIGS. 1-10B, including systems, methods, workflow, and functionality pertaining thereto. In various embodiments, the computer system 1120 is utilized to implement steps of methods and systems disclosed herein.

In certain embodiments, as depicted in FIG. 38, the computer system 1120 includes a processor 1122, a memory 1124, an interface 1130, a storage device 1128, a bus 1131, and a disk 1138. In various embodiments, the computer system 1120 is part of and/or utilized in conjunction with a display system (e.g., onboard an aircraft) that displays information (including RTA related information and displays of the types depicted in the Figures and described herein), and that utilizes data and information, including pertaining to the RTA and related data, from transceivers, sensors, and the like, for example that may also be onboard the aircraft and/or in communication therewith.

In the depicted embodiment, the computer system 1120 includes a processor 1122, a memory 1124, an interface 1130, a storage device 1128, and a bus 1131. The processor 1122 performs the computation and control functions of the computer system 1120, and may comprise any type of processor or multiple processors, single integrated circuits such as a microprocessor, or any suitable number of integrated circuit devices and/or circuit boards working in cooperation to accomplish the functions of a processing unit. During operation, the processor 1122 executes one or more programs 1132 contained within the memory 1124 and, as such, controls the general operation of the computer system 1120, generally in executing the processes disclosed herein, including with respect to the steps, workflow, and functionality depicted in FIGS. 1-10B and described above in connection therewith.

The memory 1124 can be any type of suitable memory. For example, the memory 1124 may include various types of dynamic random access memory (DRAM) such as SDRAM, the various types of static RAM (SRAM), and the various types of non-volatile memory (PROM, EPROM, and flash). In certain examples, the memory 1124 is located on and/or co-located on the same computer chip as the processor 1122. In the depicted embodiment, the memory 1124 stores the above-referenced program 1132 along with one or more models 1134 and stored values 1136.

The bus 1131 serves to transmit programs, data, status and other information or signals between the various components of the computer system 1120. The interface 1130 allows communications to the computer system 1120, for example from an individual and/or from another computer system, and can be implemented using any suitable method and apparatus. The interface 1130 can include one or more network interfaces to communicate with other systems or components. The interface 1130 may also include one or more network interfaces to communicate with technicians, and/or one or more storage interfaces to connect to storage apparatuses, such as the storage device 1128.

The storage device 1128 can be any suitable type of storage apparatus, including various different types of direct access storage and/or other memory devices. In one exemplary embodiment, the storage device 1128 comprises a program product from which memory 1124 can receive a program 1132 that executes one or more embodiments of one or more processes of the present disclosure. In another exemplary embodiment, the program product may be directly stored in and/or otherwise accessed by the memory 1124 and/or one or more other disks 1138 and/or other memory devices.

The bus 1131 can be any suitable physical or logical means of connecting computer systems and components. This includes, but is not limited to, direct hard-wired connections, fiber optics, infrared and wireless bus technologies. During operation, the program 1132 is stored in the memory 1124 and executed by the processor 1122.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 1122) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system 1120 may also otherwise differ from the embodiment depicted in the accompanying Figures, for example in that the computer system 1120 may be coupled to or may otherwise utilize one or more remote computer systems and/or other control systems.

Accordingly, methods and systems are provided for initiating and managing required time of arrival constraints for an aircraft for all phases of flight, in accordance with exemplary embodiments.

In certain embodiments, the disclosed methods, systems, and computer program products and software may be advantageous, for example, in providing a user interface that succinctly provides indications to the crew for the following: (i) current RTA limits (minimum and maximum) for speed; (ii) current RTA limits (e.g., for earliest and latest possible times of arrival); (iii) tolerances (e.g., for how closely the aircraft can meet the target time); (iv) a distance to the targeted fix; (v) compliance for meeting the RTA constraints; (v) the RTA status (including whether the aircraft will be early, late, or on time to the fix).

In addition, in various embodiments, the disclosed methods, systems, and computer program products and software provide both a manner to easily change the desired aircraft speed through all phases of flight to meet the RTA clearance provided by air traffic control (ATC), while also quickly turning RTA constraints on and off through all phases of flight.

Moreover in various embodiments, the disclosed methods, systems, and computer program products and software provide a clear mechanism to indicate (in seconds) to the crew that they will be early, or late to the fix, and so on.

Additionally, also in various embodiments, the disclosed methods, systems, and computer program products and software provide easy access for the flight crew to set an RTA constraint for any phase of flight, adjust the aircraft speeds to meet the RTA constraint, and to easily observe or see the status of the RTA constraint. In various embodiments, the intuitive nature of the disclosed methods, systems, and computer program products and software provide a clear visualization to the crew via the Map (INAV), VSD (vertical situation display) and Waypoint list as to the status of the RTA constraint. Furthermore, in various embodiments, the overall solution may reduce cognitive load on the flight crew, as they may not need to perform any mathematical calculations related to arrival times for the constraint, and they can quickly identify where the constraints are active during all phases of flight.

It will be appreciated that the methods and systems may vary from those depicted in the Figures and described herein.

Moreover, the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

It will be appreciated that the disclosed methods, systems, and computer program products and software may vary from those depicted in the Figures and described herein.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, and the attached Figures, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   receiving data as to a required time of arrival (RTA) for an aircraft during flight, including during climbing, cruise, and descent of the aircraft;
   determining, via a processor, RTA limits for the aircraft based on the RTA, wherein the RTA limits comprise both of the following:
      limits for aircraft speed based on the RTA, wherein the limits for the aircraft speed comprise both:
         a minimum limit comprising an envelope speed for the aircraft; and
         a maximum limit comprising a maximum allowable speed for the aircraft;
      a plurality of limits for aircraft arrival time based on the RTA, including an earliest possible time of arrival, a latest possible time of arrival, and a predetermined time accuracy tolerance for the aircraft arrival time during the climbing, cruise, and descent of the aircraft;
   displaying, via a display device in accordance with instructions provided by the processor, a request for an RTA constraint for the aircraft;
   determining, via the processor, a recommended speed for the aircraft for compliance with the RTA constraint;
   determining, via the processor, whether the aircraft is early, on time, or late with respect to the RTA constraint, based on the recommended speed in addition to the envelope speed for the aircraft, the maximum allowable speed for the aircraft, and the plurality of limits for aircraft arrival time based on the RTA, including the earliest possible time of arrival, the latest possible time of arrival, and the predetermined time accuracy tolerance for the aircraft arrival time during the climbing, cruise, and descent of the aircraft;
   displaying, via the display device in accordance with instructions provided by the processor, the recommended speed for the aircraft for compliance with the RTA constraint; and
   displaying, via the display device in accordance with instructions provided by the processor:
   a direct color-coded status as to whether the aircraft is early, on time, or late with respect to the RTA constraint, with respect to each particular waypoint of a plurality of waypoints of a flight path of the aircraft to reach its destination;
   the RTA;
   the limits for aircraft speed based on the RTA, including both the minimum limit and the maximum limit for the aircraft speed based on the RTA; and
   the plurality of limits for aircraft arrival time based on the RTA, including the earliest possible time of arrival, the latest possible time of arrival, and the predetermined time accuracy tolerance for the aircraft arrival time during the climbing, cruise, and descent of the aircraft.

2. The method of claim 1, wherein the step of determining the RTA limits comprises:
 determining, via the processor, both the limits for aircraft speed and the plurality of limits for aircraft arrival time based on the RTA.

3. The method of claim 1, wherein the method is performed during all phases of flight for the aircraft, including takeoff, cruise, and landing.

4. The method of claim 1, wherein the displaying of the direct color-coded status comprises displaying the direct color-coded status:
 with a first color when the aircraft is on time with respect to the RTA constraint; and
 with a second color, different from the first color, when the aircraft is early or late with respect to the RTA constraint.

5. The method of claim 4, wherein the displaying of the direct color-coded status comprises displaying the direct color-coded status:
 with a green color when the aircraft is on time with respect to the RTA constraint;
 with an amber color when the aircraft is early or late with respect to the RTA constraint.

6. The method of claim 4, wherein the displaying of the direct color-coded status comprises displaying the direct color-coded status:
 with the first color when the aircraft is on time with respect to the RTA constraint;
 with the second color when the aircraft is early with respect to the RTA constraint, accompanied by an amount of time in which the aircraft is early with respect to the RTA constraint; and
 with the second color when the aircraft is late with respect to the RTA constraint, accompanied by an amount of time in which the aircraft is late with respect to the RTA constraint.

7. The method of claim 1, wherein the one or more minimum limits for the aircraft speed based on the RTA are further limited by: (i) a minimum envelope speed (ENV); (ii) maximum endurance speed (END); and (iii) an RTA minimum speed (MIN) for the aircraft.

8. The method of claim 7, wherein the one or more maximum limits for the aircraft speed based on the RTA are further limited by: (i) a maximum envelope speed (ENV) and (ii) an RTA maximum speed (Max) for the aircraft.

9. The method of claim 1, further comprising:
 determining, via the processor, whether the RTA is feasible for the aircraft to attain, in view of the recommended speed in addition to the envelope speed for the aircraft, the maximum allowable speed for the aircraft, and the plurality of limits for aircraft arrival time based on the RTA, including the earliest possible time of arrival, the latest possible time of arrival, and the predetermined time accuracy tolerance for the aircraft arrival time during the climbing, cruise, and descent of the aircraft;
 displaying, via the display device in accordance with instructions provided by the processor, whether the RTA is feasible.

10. The method of claim 1, further comprising:
 determining, via the processor, that the RTA is not feasible for the aircraft to attain, when the aircraft is late and the speed needed to arrive within the predetermined time accuracy tolerance is greater than the maximum allowable speed for the aircraft.

11. The method of claim 10, further comprising:
 determining, via the processor, that the RTA is not feasible for the aircraft to attain, when the aircraft is early and the speed needed to arrive within the predetermined time accuracy tolerance is less than the envelope speed for the aircraft.

12. The method of claim 11, wherein the predetermined time accuracy tolerance is equal to a default value that is subject to calibration by a user of the aircraft.

13. The method of claim 12, wherein the default value is equal to approximately ten seconds with a ninety five percent confidence ability.

14. The method of claim 1, further comprising:
 displaying, via the display device in accordance with instructions provided by the processor, a default RTA value in a first RTA color;
 determining, via the processor, whether a user has manually edited the default value, generating a manually edited default value; and
 displaying, via the display device in accordance with instructions provided by the processor, the manually edited default value in a second RTA color, different from the first RTA color, when the user has manually edited the default value.

15. The method of claim 14, wherein:
 the first RTA color is green; and
 the second RTA color is white.

16. A program product comprising:
 a non-transitory computer readable storage media configured to store a program that is configured to at least facilitate:
 receiving data as to a required time of arrival (RTA) for an aircraft during flight, including during climbing, cruise, and descent of the aircraft;
 determining RTA limits for the aircraft based on the RTA, wherein the RTA limits comprise both of the following:
 limits for aircraft speed based on the RTA, wherein the limits for the aircraft speed comprise both:
 a minimum limit comprising an envelope speed for the aircraft; and
 a maximum limit comprising a maximum allowable speed for the aircraft; and
 a plurality of limits for aircraft arrival time based on the RTA, including an earliest possible time of arrival, a latest possible time of arrival, and a predetermined time accuracy tolerance for the aircraft arrival time during the climbing, cruise, and descent of the aircraft;
 displaying, via a display device in accordance with instructions provided by the program, a request for an RTA constraint for the aircraft;
 determining a recommended speed for the aircraft for compliance with the RTA constraint;
 determining whether the aircraft is early, on time, or late with respect to the RTA constraint, based on the recommended speed in addition to the envelope speed for the aircraft, the maximum allowable speed for the aircraft, and the plurality of limits for aircraft arrival time based on the RTA, including the earliest possible time of arrival, the latest possible time of arrival, and the predetermined time accuracy tolerance for the aircraft arrival time during the climbing, cruise, and descent of the aircraft;
 displaying, via the display device in accordance with instructions provided by the program, recommended speed for the aircraft for compliance with the RTA constraint; and displaying, via the display device in accordance with instructions provided by the processor:
- a direct color-coded status as to whether the aircraft is early, on time, or late with respect to the RTA constraint, with respect to each particular waypoint of a plurality of waypoints of a flight path of the aircraft to reach its destination;
- the RTA;
- the limits for aircraft speed based on the RTA; and
- the plurality of limits for aircraft arrival time based on the RTA, including the earliest possible time of arrival, the latest possible time of arrival, and the predetermined time accuracy tolerance for the aircraft arrival time during the climbing, cruise, and descent of the aircraft; and a processor coupled to the non-transitory computer readable storage media a configured to execute the program.

17. An aircraft comprising:
a body;
a propulsion system configured to move the body; and
a control system configured to control the propulsion system, the control system comprising:
- a non-transitory computer readable storage media configured to store a program that is configured to at least facilitate:
  - receiving data as to a required time of arrival (RTA) for the aircraft during flight, including during climbing, cruise, and descent of the aircraft;
  - determining RTA limits for the aircraft based on the RTA, wherein the RTA limits comprise both of the following:
    - limits for aircraft speed based on the RTA; and
    - a plurality of limits for aircraft arrival time based on the RTA, including an earliest possible time of arrival, a latest possible time of arrival, and a predetermined time accuracy tolerance for the aircraft arrival time during the climbing, cruise, and descent of the aircraft;
  - displaying, via a display device in accordance with instructions provided by the program, a request for an RTA constraint for the aircraft;
  - determining a recommended speed for the aircraft for compliance with the RTA constraint;
  - determining, via the processor, whether the aircraft is early, on time, or late with respect to the RTA constraint, based on the recommended speed in addition to the envelope speed for the aircraft, the maximum allowable speed for the aircraft, and the plurality of limits for aircraft arrival time based on the RTA, including the earliest possible time of arrival, the latest possible time of arrival, and the predetermined time accuracy tolerance for the aircraft arrival time during the climbing, cruise, and descent of the aircraft;
  - displaying, via the display device in accordance with instructions provided by the program, recommended speed for the aircraft for compliance with the RTA constraint; and
  - displaying, via the display device in accordance with instructions provided by the processor:
    - a direct color-coded status as to whether the aircraft is early, on time, or late with respect to the RTA constraint, with respect to each particular waypoint of a plurality of waypoints of a flight path of the aircraft to reach its destination;
    - the RTA;
    - the limits for aircraft speed based on the RTA; and
    - the plurality of limits for aircraft arrival time based on the RTA, including the earliest possible time of arrival, the latest possible time of arrival, and the predetermined time accuracy tolerance for the aircraft arrival time during the climbing, cruise, and descent of the aircraft; and
  - a processor coupled to the non-transitory computer readable storage media a configured to execute the program.

18. The aircraft of claim 17, wherein the displaying of the direct color-coded status comprises displaying the direct color-coded status:
- with a first color when the aircraft is on time with respect to the RTA constraint; and
- with a second color, different from the first color, when the aircraft is early or late with respect to the RTA constraint.

19. The aircraft of claim 18, wherein the displaying of the direct color-coded status comprises displaying the direct color-coded status:
- with a green color when the aircraft is on time with respect to the RTA constraint;
- with an amber color when the aircraft is early or late with respect to the RTA constraint.

20. The aircraft of claim 18, wherein the displaying of the direct color-coded status comprises displaying the direct color-coded status:
- with the first color when the aircraft is on time with respect to the RTA constraint;
- with the second color when the aircraft is early with respect to the RTA constraint, accompanied by an amount of time in which the aircraft is early with respect to the RTA constraint; and
- with the second color when the aircraft is late with respect to the RTA constraint, accompanied by an amount of time in which the aircraft is late with respect to the RTA constraint.

* * * * *